(12) United States Patent
Kochi

(10) Patent No.: US 6,928,384 B2
(45) Date of Patent: Aug. 9, 2005

(54) IMAGE MEASUREMENT AND DISPLAY DEVICE, IMAGE MEASUREMENT AND DISPLAY SYSTEM, CONSTRUCTION MANAGEMENT METHOD, AND CONSTRUCTION STATUS MONITOR SYSTEM

(75) Inventor: Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 415 days.

(21) Appl. No.: 10/156,763

(22) Filed: May 29, 2002

(65) Prior Publication Data

US 2003/0004645 A1 Jan. 2, 2003

(30) Foreign Application Priority Data

May 29, 2001 (JP) ........................................ 2001-161286

(51) Int. Cl.[7] .............................................. G01B 15/04
(52) U.S. Cl. ...................................... 702/155; 702/127
(58) Field of Search .............................. 356/2, 601, 3, 356/388, 392; 382/190, 102, 106, 108, 141, 153, 154; 702/1, 2, 5, 127, 150, 151, 152, 153, 155, 156, 158, 159, FOR 110, 16, 33, 167; 33/700, 701; 342/118; 345/7, 9, 418, 419, 501, 530; 367/118, 119, 124; 404/84.05, 84.5; 700/90, 98, 108, 109, 118, 120

(56) References Cited

U.S. PATENT DOCUMENTS

| | | | | |
|---|---|---|---|---|
| 4,928,175 A | * | 5/1990 | Haggren | 348/159 |
| 5,359,675 A | * | 10/1994 | Siwoff | 382/114 |
| 5,396,331 A | * | 3/1995 | Kitoh et al. | 356/611 |
| 5,519,485 A | * | 5/1996 | Ohtani et al. | 356/2 |
| 5,757,674 A | * | 5/1998 | Marugame | 702/152 |
| 6,041,140 A | * | 3/2000 | Binns et al. | 382/209 |
| 6,171,018 B1 | | 1/2001 | Ohtomo et al. | |
| 6,507,406 B1 | * | 1/2003 | Yagi et al. | 356/602 |
| 6,636,635 B2 | * | 10/2003 | Matsugu | 382/218 |

FOREIGN PATENT DOCUMENTS

| | | |
|---|---|---|
| JP | 6-307853 | 11/1994 |
| JP | 8-134958 | 5/1995 |
| JP | 11-236716 | 8/1999 |

OTHER PUBLICATIONS

Drocourt, C; Delahoche, L; Marhic, B; Clerentin, A;"Simultaneous Localization and Map Construction Using Omnidirectional Stereoscopic Information";IEEE Int'nl Conference on Robotics and Automation; vol. 1; 11–15 Ma 2002; pp 894–899.*

Loaiza, H; Triboulet, J; Lelandais, S; Barat, C;"Matching Segments in Stereoscopic Vision";IEEE Instrumentation and Measurement Magazine; vol. 4, issue 1; Mar. 2001; pp 37–42.*

(Continued)

Primary Examiner—John Barlow
Assistant Examiner—Douglas N Washburn
(74) Attorney, Agent, or Firm—Foley & Lardner LLP

(57) ABSTRACT

A device includes a shape measuring section 350 for measuring shape data from a pair of stereovision images of an object taken with an image taking section 2209 a memory section 340 for storing target data related to the images of the object; an image display section 330 for superposing the paired stereovision images of the object and the stereovision target data image based on the target data and for displaying the images; and a comparison display processing section 360 for comparing the shape data of the object measured by the shape measuring section 350, with the target data and reflecting the results of the comparison on the superposed display on the image display section 330.

17 Claims, 17 Drawing Sheets

OTHER PUBLICATIONS

G. S. Cheok et al., "Ladars for Construction Assessment and Update", Automation in Construction, vol. 9, No. 5–6, Sep. 2000, pp. 463–477.

A. Retik et al., "Integrating Virtual Reality and Telepresence to Remotely Monitor Construction Sites: A ViRTUE Project", Artificial Intelligence in Structure Engineering Information Technology for Design, Collaboration, Maintenance, and Monitoring, 1998, pp. 460–463.

G. Mair et al., "Integrated Telepresence, Virtual Reality, and Mobile Communications", Proceedings of Mechatronics, 1998, pp. 805–810.

J. A. Noble et al., "High Precision X–Ray Stereo for Automated 3–D CAD–Based Inspection", IEEE Transactions on Robotics and Automation, vol. 14, No. 2, Apr. 1998, pp. 292–302.

R. Koch, "3–D Surface Reconstruction from Stereoscopic Image Sequences", Proceedings of Fifth International Conference of Computer Vision, Jun. 20–23, 1995, pp. 109–114.

M. Kanbara et al., "Real–time Composition of Stereo Images for Video See–through Augmented Reality", Proceedings of International Conference on Multimedia Computing and Systems, 1999, p. 213 (left–hand column), p. 214 (right–hand column).

* cited by examiner

Left-hand image      Right-hand image

Virtual wall

FIG.14
(A)
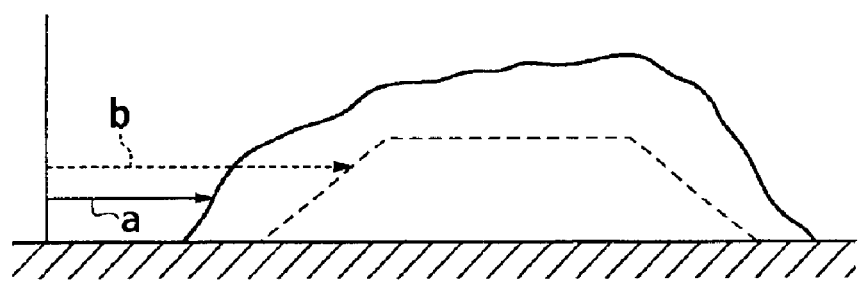
(B)
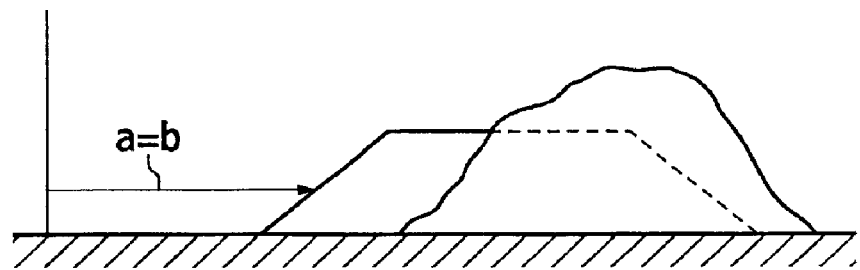

FIG.19
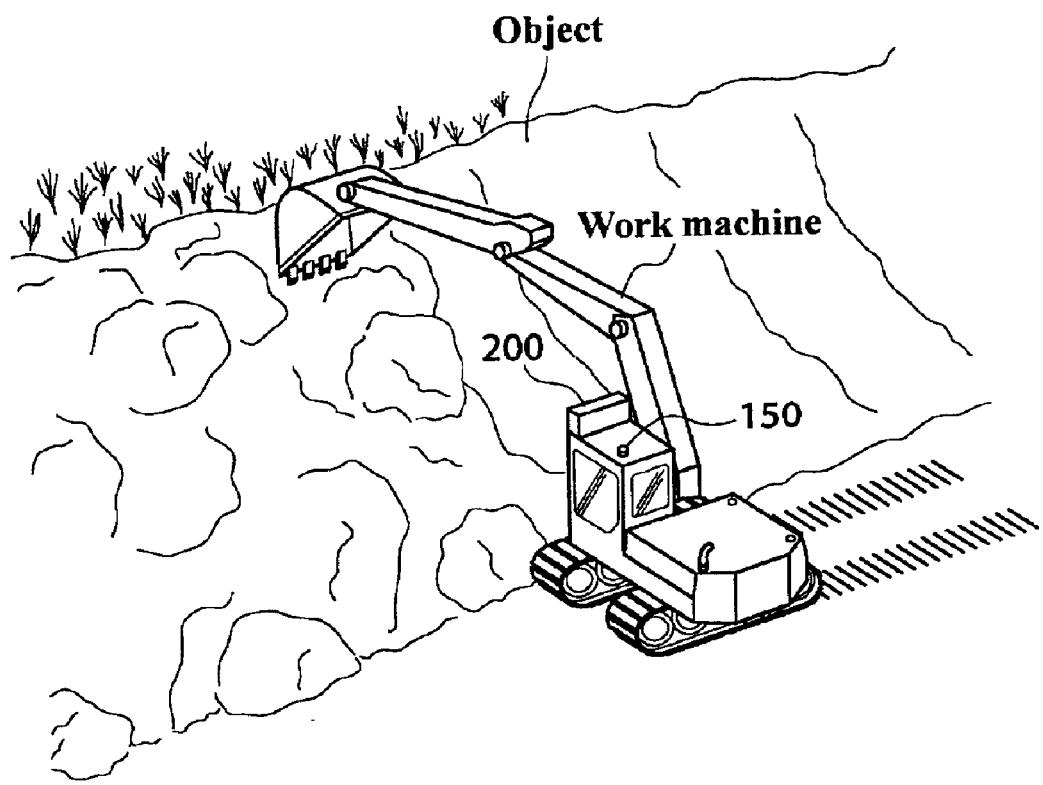
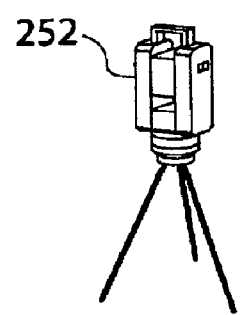

IMAGE MEASUREMENT AND DISPLAY DEVICE, IMAGE MEASUREMENT AND DISPLAY SYSTEM, CONSTRUCTION MANAGEMENT METHOD, AND CONSTRUCTION STATUS MONITOR SYSTEM

BACKGROUND OF INVENTION

1. Field of the Invention

The invention relates to an image measurement and display device, an image measurement and display system, and a construction management method suitable when used in constructing large scale structures such as dams and power stations and in development of residential sites, and particularly to those that enables a person in charge of carrying out the construction or manufacturing to easily find out if the construction or manufacturing is carried exactly as shown on design drawings. The invention also relates to an image measurement and display device, an image measurement and display system, and a construction management method that enable to find out at a construction management office the status of the construction or manufacturing of objects being constructed or manufactured and, particularly to those that enables detailed measurement of objects being constructed or manufactured and enables accurate comparison with design drawings. The invention further relates to a construction status monitor system helpful for accurately finding out the daily progress status of objects being constructed or manufactured and for re-planning the construction or manufacturing so that the construction or manufacturing goes on exactly as planned.

2. Description of the Related Art

Conventionally, in the civil engineering, ropes and landmarks, so called finishing stake, for indicating designed shapes such as positions and directions, to construct truly to design drawings are placed by an operator and the operator executes construction work according to such finishing stakes. In recent years, an advanced method is developed in which work machines such as power shovels and bulldozers are equipped with a sensor and the operator operates the machine while monitoring or automatically controlling the horizontal position with laser (Refer to, for example JP-A-11-236716 proposed by the applicant). In another proposal, it is intended to take images of the construction status with a remote control monitor camera and to carry out the construction while superposing the taken image on design drawings.

However, with the above methods of controlling the construction status, the construction is difficult for the operator to carry out actually exactly as indicated on the design drawings. And the construction takes much time, and requires many corrections, as follows:

(1) The method with finishing stakes can make only rough comparison with the design drawings. Moreover, the ground is steep in some places and it is difficult to place the finishing stakes. Because the finishing stakes must be placed by the operator, the placement work often takes much time in particular on a natural ground.

(2) Since the method using laser is intended to control horizontal positions, the work on a sloping ground or face of slope requires auxiliary equipment. The problem of difficulty in placing the auxiliary equipment on the steep natural ground remains the same with the method using finishing stakes.

(3) The method of taking the image of the construction status with a remote control camera and comparing the taken image with the design drawings has a problem that the superposition of the design drawing, namely CG (computer graphics) image, on the real image is difficult, and that the design drawing is absorbed in the real image and is not easy to seen. Still another problem for the operator is that the visual point of the image taken with the camera is different from the visual point of the operator who is actually operating the work machine, requiring much skill to operate the work machine while holding down the difference between the taken image and the design drawing.

On the other hand, the person who manages the construction has problems of difficulty in finding out daily status of progress of the construction and difficulty in quickly planning future man-hours and construction based on current status. Since construction and earth moving work of a large scale involves a large amount of investment in plant-and-equipment, strict observation of delivery deadline and construction period is necessary for the customer and it is very important to manage the construction to meet the conditions of contracts of the large scale structures.

SUMMARY OF THE INVENTION

The first object of the invention is to provide an image measurement and display device capable of measuring in detail objects to be constructed or manufactured and comparing accurately the measurements with design drawings. The second object is to provide such an image measurement and display device that enables a person in charge of construction or manufacturing to find out easily whether or not the construction or manufacturing is carried out in compliance with design drawings and enables the person to carry out the construction or manufacturing exactly as specified on the design drawings in a simple manner. The third object is to provide a construction status monitor system useful for finding out accurately the daily status of progress in construction or manufacturing and for organizing the construction or manufacturing flexibly to meet construction plans.

The first invention related to the image measurement and display device for accomplishing the first object, comprises, as shown in FIG. 1 or 21: a shape measuring section 350 for measuring shape data of an object from a pair of stereovision images of the object taken with an image taking section 220; a memory section 340 for storing target data related to the image of the object; an image display section 330, 110a for displaying in superposition the paired stereovision images of the object and the stereovision target data images of the object based on the target data; and a comparison display processing section 360, 120a for comparing the shape data of the object with the target data and for reflecting the results of the comparison on the superposed display on the image display section 330, 110a.

In such an arrangement, the status of the construction on the construction site is remotely measured by measuring in the shape measuring section 350 the shape data of the object from the paired stereovision images of the object taken with the image taking section 220. In the memory section 340 are stored target data related to the object image, which target data are to be the completion target of the construction site. The image display section 330, 110a is placed, for example, in the vicinity of the construction management person distant from the work machine or in the operation cabin of the work machine to display the paired stereovision images of the object superposed over the stereovision target data images of the object based on the target data. The comparison display processing section 360, 120a compares the shape data of the object with the target data, and reflects the comparison results on the superposed display on the image display section 330, 110a, so that the construction operator or the construction management person can easily find out the relationship between the current status on the construction site and the target data by means of the superposed display of the comparison results.

The second invention related to the image measurement and display device for accomplishing the first object, comprises, as shown in FIG. 1 or 21: a shape measuring section 350 for measuring shape data of an object from a pair of stereovision images of an object taken with an image taking section 220; an imaging position measuring section, corresponding to an automatic tracing type of surveying instrument 252 and a camera position taking section 250, for measuring the position where the image taking section 220 takes images of the object; a memory section 340 for storing target data related to the image of the object; image display sections 330, 110a for displaying in superposition, on the basis of the imaging position measured with the imaging position measuring section (250, 252), the images of the object and the target data images based on the target data; and a comparison display processing section 360, 120a for comparing, on the basis of the imaging position measured with the imaging position measuring sections (250, 252), the shape of the object with the shape corresponding to the target data, and for reflecting the comparison results on the superposed display on the image display section 330, 110a.

In such an arrangement, the imaging position of the image taking section 220 is measured with the imaging position measuring sections (250, 252). Therefore, the information on the imaging position measured with the imaging position measuring sections (250, 252) may be used in mutual comparison and superposition of the object shape and the shape corresponding to the target data in the image display sections 330 and 110a and the comparison display processing section 360, 120a, so that the image conversion processing required for the superposition is carried out smoothly.

In the first and second inventions, it is preferable that the comparison results obtained with the comparison display processing section 360, 120a are reflected by the display on the image display section 330, 110a so that the part where the shape of the object approximately agrees with the shape corresponding to the target data is displayed distinguishably, so that the status of the construction based on whether or not the target data are reached is easily found out. The first and second inventions are preferably constituted that, as the results of the comparison with the comparison display processing section 360, 120a, the distance or interval to the object is associated with that to the target data, and then their comparative sized of the object and the target data are displayed distinguishably on the image display section 330, 110a, so that whether or not the construction status has reached the target data is easily found out by using the comparative sizes of the object and the target data. In the first and second inventions, it is preferable to provide an intermediate target data setting means 370 for setting intermediate target data as the target data for the comparison display processing sections 360, 120a and the image display sections 330, 110a, in every stage of construction on the object and also preferable to constitute the comparison display processing section 360, 120a so as to compare the object shape with the shape corresponding to the intermediate target data, so that intermediate target data exactly matching the daily status of construction are displayed in such a manner that can be understood by the person in charge of the construction and the person who manages the construction.

The third invention related to the image measurement and display device for accomplishing the second object, comprises, as shown in FIG. 1: a shape measuring section 350 for measuring the shape data of an object from a pair of stereovision images of the object taken with an image taking section 220; a memory section 340 for storing target data related to the image of the object; an image observing section 110 for superposing the object related to the target data and the stereovision target data image of the object based on the target data and for displaying with the object remaining to be visible; and a comparative observation display processing section 120 for comparing the object shape measured by the shape measuring section 350, with the shape corresponding to the target data and for reflecting the comparison results to be on the stereovision target data image display of the image observing section 110.

With the above device, the construction status of the construction site is observed remotely by measuring with the shape measuring section 350 the shape data of the object from a pair of stereovision images of the object that are imaged with the image taking section 220. In the memory section 340 are memorized target data related to the object image, and the target data that are to be the completion target of the construction site are stored. The image observing section 110 displays in superposition the stereovision target data images of the object based on the target data in the state of the object related to the target data being visible by the eye. The comparative observation display processing section 120 compares the object shape measured with the shape measuring section 350, with the shape corresponding to the target data, so that the comparison results are reflected on the stereovision target data image displayed on the image observing section 110.

The fourth invention related to the image measurement and display device for accomplishing the second object, comprises, as shown in FIG. 1: a shape measuring section 350 for measuring shape data of an object from a pair of stereovision images of the object taken with an image taking section 220; an imaging position measuring section (250, 252) for measuring the imaging position of the image taking section; a memory section 340 for storing target data related to the images of the object; an image observing section 110 for superposing the object related to the target data, on the basis of the imaging position measured with the imaging position measuring sections (250, 252), the stereovision target data image of the object based on the target data and for displaying with the object remaining to be visible; and the comparative observation display processing section 120 for comparing, on the basis of the imaging position measured with the imaging position measuring position, the object shape measured by the shape measuring section 350, with the shape corresponding to the target data, and for reflecting the result of the comparison on the stereovision target data image display of the image observing section 110.

In the above device, the imaging position of the image taking section 220 is measured with the imaging position measuring sections (250, 252). Therefore, the information on the imaging position measured with the imaging position measuring sections (250, 252) may be used in comparing and superposing the object shape with the shape corresponding to the target data by means of the image observing section 110 and the comparative observation display processing section 120, so that image conversion processing required for superposing the stereovision target data image display over the real image of the object is carried out smoothly.

In the third and fourth inventions, it is preferable that the image observing section 110 includes at least one of a head-up display and a head-mount display, so that the person in charge of the work can see the stereovision target data image while seeing the object by the naked eye without moving the line of sight. In the third and fourth inventions, it is preferable that the results of the comparison carried out with the image processing section 120 for forming the image to carry out comparative observation and display are reflected on the display of the image observing section 110, so that positions may be discriminated where the object shape is found to match approximately the shape corresponding to the target data, and that the status of the construction is easily found out on the basis of whether or not the target data are reached. In the third and fourth inventions, it is preferable that the comparative result in the image processing section 120 forming images for performing comparative observation display is the distance or interval to the object and the target data and that the comparative sizes of the object and the target data are displayed on the image observing section 110 so that whether or not the construction status has reached the target data is easily found out by using the relative sizes of the object and the target data.

The fifth invention related to an image measurement and display system for accomplishing the first and second objects, comprises, as shown in FIG. 1 comprises: an image taking section 220 for taking a pair of stereovision images of an object; an image observing sections 110 for displaying the images taken with the image taking section 220; a memory section 340 for storing target data related to the images of the object; and a construction status measuring device 300 including an image calculation processing section 320 for processing images of the object taken with the image taking section, to exchange data among the image taking section 220, the image observing sections 110, and the construction status measuring device 300. The construction status measuring device 300 further comprises a shape measuring section 350 for measuring the shape of the object using the paired stereovision images taken with the image taking section 220 and a comparison display processing section 360 for comparing the object shape measured by the shape measuring section 350, with the shape corresponding to the target data. The image observing sections 110 is constituted to display the object image obtained with the image taking section 220 superposed over the object data image formed with the target data coming as sent from the construction status measuring device 300.

To exchange data among the monitoring unit 200 including the image taking section 220, a construction display device 100 including the image observing section 110, and the construction status measuring device 300, it is preferable to use one of the existing communication infrastructures: wireless, optical, the Internet, and cable communications.

The sixth invention related to the construction management method for accomplishing the second object, comprises, as shown in FIG. 4, the steps of: determining the three-dimensional position of a construction display device 100 with an image taking position measuring sections (250, 252) (R10); acquiring distance images in real time from multiple stereovision images in two dimensions (R10); superposition, on the basis of the three-dimensional positions, the target data and the stereovision images of the object being processed and displaying the superposed image on the construction display device 100 (S40, S60); and causing a work machine to execute work according to the information on deviation of the stereovision images, related to the object being processed, from the target data (R40, R50).

The seventh invention related to the construction management method for accomplishing the first object, comprises, as shown in FIG. 4, the steps of: determining the three-dimensional position of a construction display device 100 with an imaging position measuring sections (250, 252) (R10); acquiring distance images from multiple stereovision images in real time in two dimensions (R10); measuring the multiple stereovision images (S50); analyzing construction progress status from the current status of an object being processed and target data (S70); and updating from time to time the construction plan for realizing the target data according to the results of analyzing the construction progress status (S85).

The eighth invention related to the work monitoring system for accomplishing the third object, comprises, as shown in FIG. 1: the image measurement and display device (the construction display device 100, the monitoring unit 200, and the construction status measuring device 300) as set forth in any one of claims 1 to 5; and a construction plan drafting and correcting means 380 for calculating from the comparison results obtained with the comparison display processing section, the work-related data for processing or treating an object to meet the target data.

This application is based on Japanese patent applications, No. 2001-161286 filed in Japan on May 29, 2001, which are entirely incorporated herein by reference.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BRIEF DESCRIPTION OF THE DRAWINGS

FIGS. 14(A) and (B) are for explaining comparison of target data of a changed area from a distance image of a construction area.

FIG. 19 shows an example of relationship between positions of a monitoring unit and a work machine in the second embodiment of use.

DESCRIPTION OF PREFERRED EMBODIMENTS

Figure 1:
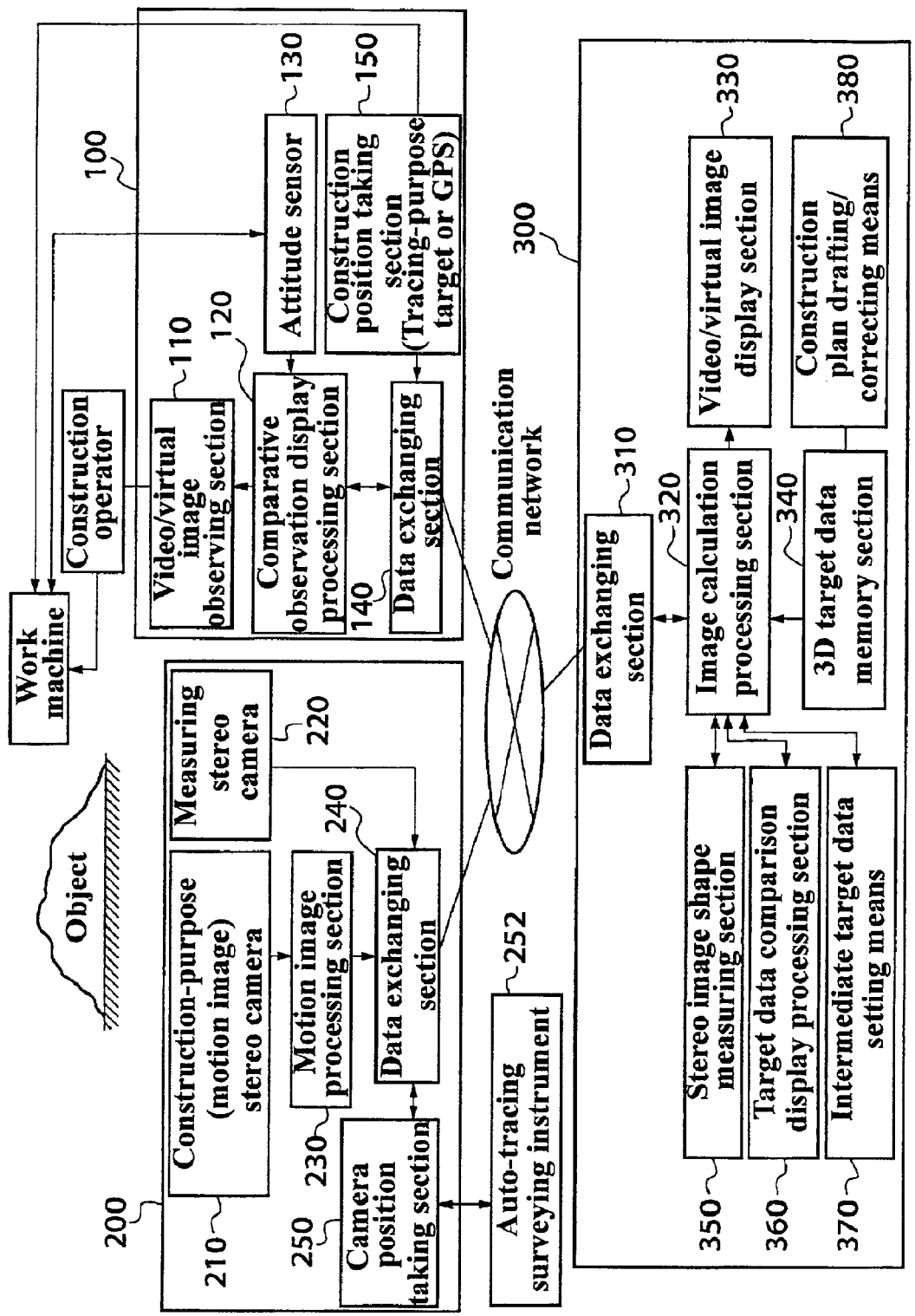
FIG. 1 is an overall block diagram of a construction monitoring system provided with a construction display device and a construction status measuring device according to the invention.

Embodiments of the invention will be hereinafter described in reference to the appended drawings. The same or counterpart components in the drawings are provided with the same or similar reference numerals or symbols to avoid redundancy in explanation. FIG. 1 is an overall block diagram of a construction monitoring system according to the invention which is provided with a construction display device and a construction status measuring device. The construction display device 100 is installed in the cockpit of the work machine used on the construction site, or attached to the helmet of the construction site supervisor or the operator, for easy comparison of the construction site situation with the construction target based on the design drawings. The monitoring unit 200 is for taking images of the construction site in the current state and is placed in a position where the work machine operator can monitor the state of construction executed by the operator or with the work machine using the construction display device 100.

The construction status measuring device 300 is installed, for example, in a construction management office and has three-dimensional data (hereinafter referred to as target data), stored in advance, of the design drawings or of the final expected results. And the device reads the stereovision images of the site status taken from the monitoring unit 200 placed on the construction site, performs detailed calculation process, and compares the results with the target data to plan and estimate the work. The construction management office is located in a building standing either distant from or near the construction site. The construction site refers to any object on which earth-moving work, such as work on a face of slope, lot reclamation-construction, excavation for investigating archaeological sites, disaster preventive construction, etc. is executed.

The construction display device 100 comprises a real image/virtual image observing section 110 as an image observing section, an image processing section 120 as a comparative observation display processing section for performing image visual point conversion calculation, an attitude sensor 130, a data exchanging section 140, and a construction position taking section 150. The real image/virtual image observing section 110 preferably consists of an HUD (head-up display) or HMD (head-mount display) of the optical see-through image type. With the optical see-through image type, since a CG image as a target data image is synthesized in the field of vision of the construction operator who is viewing the actual construction site, namely since the image is not virtual, the type is suitable for the operator to carry out the construction in real time without feeling inconsistency.

The image processing section 120 uses the attitude data of the construction display device 100 measured with the attitude sensor 130 and the three-dimensional position data found with the construction position taking section 150 to convert the CG image as the target data image sent from the construction status measuring device 300 into the image as viewed from the visual point of the operator. The image processing section 120 aligns the position of the CG image as the target data image, as seen from the visual point of the operator who is processing the object with the work machine and sends the image to the real image/virtual image observing section 110. As a result, the real image/virtual image observing section 110 displays the CG image, the target data image, as superposed over the real image of the object within the field of vision of the operator.

The attitude sensor 130 measures the attitude of the construction display device 100, for example angles of three axes, in vertical, lateral, and depth directions. The data exchanging section 140 receives images from the monitoring unit 200, design images and data from the construction status measuring device 300, and three-dimensional coordinates from an automatic tracing type of surveying instrument 252 or GPS.

The construction position taking section 150 is an arrangement for picking up three-dimensional position data of the construction display device 100, such as the GPS (global positioning system), mobile terminal position search service in mobile communication, and a combination of an automatic tracing type of surveying instrument and tracing targets. The automatic tracing type of surveying instrument is proposed and disclosed by the applicant, for example in JP-A-6-307853. The tracing targets may be prisms and reflection sheets. Furthermore, the attitude sensor 130 may be combined with an accelerometer and a gyro to detect direction and distance of movement, to detect movement distance relative to a reference position, and to find three-dimensional position as a supplement.

The monitoring unit 200 includes a construction stereo camera 210 for constantly monitoring the construction status, a measurement stereo camera 220 serving as an image taking section, a motion image processing section 230, a data exchanging section 240, and a camera position taking section 250 serving as an image taking position measuring section.

In the case the automatic tracing type of surveying instrument 252 is used, a reflection prism or a reflection sheet serving as a camera position taking section 250 is attached to the monitoring unit 200. The position data of the monitoring unit 200 found with the automatic tracing type of surveying instrument 252 are received with the data exchanging section 240. The position data received are synchronized with the images taken with the stereo camera and sent from the data exchanging section 240 to the data exchanging section 310 of the construction status measuring device 300. In this way, the relationship of positions of the monitoring unit 200 and the construction display device 100 is known and the positions of the target data image and the construction image can be aligned easily.

The construction stereo camera 210 is used to measure the distance in two dimensions to the object while the object is being processed in real time and to compare the result with the target data during the construction. The measurement-purpose stereo camera 220 measures in detail the results of construction and the state of the object before and after the construction, and uses the results for various purposes such as estimation and planning. In view of measurement accuracy, the stereo camera 220 for measurement is higher in accuracy than the construction stereo camera 210. Also in view of accuracy, the baseline of the measurement-purpose stereo cameras 220 (the distance between cameras) must be long, and the construction stereo camera 210 may be of such an accuracy that suffices for the purpose of monitoring the construction in real time, executing construction, and finding the distance to the object. Therefore, the baseline of the construction stereo cameras 210 need not be longer than that of the measurement-purpose stereo cameras 220.

Depending on the object requiring no high accuracy, the construction stereo camera 210 and the measurement stereo camera 220 may of the same type. However, since the same cameras are used differently for the construction and measurement, the stereovision image processing is carried out also differently. The measurement stereo cameras 220 and the construction stereo cameras 210 may be prepared respectively in plural numbers, two or more, to realize multiple image stereovision. Use of two or more cameras can eliminate the problem of occlusion (sight blockage) and enhance reliability.

The construction status measuring device 300 includes: a data exchanging section 310, an image calculation processing section 320 serving as an image processing section, a video/virtual image display section 330 serving as an image display section, a three-dimensional target data memory section 340 serving as a memory section, a stereovision image shape measuring section 350 serving as a shape measuring section, a target data image comparison display processing section 360 serving as a comparison display processing section, an intermediate target data setting means 370, and a construction plan drafting and correcting means 380.

The data exchanging section 310 may be any device, such as a PHS (personal handy-phone system), mobile communication terminal, fixed communication terminal, etc. that can be connected to the Internet and exchange image data interactively with the construction display device 100. The image data may include those of motion images in addition to those of static images. The image calculation processing section 320 is constituted with a computer such as a personal computer to cause the stereovision image shape measuring section 350 to measure in detail in three dimensions the stereovision images sent from the monitoring unit 200 on the construction site. The image calculation processing section 320 further processes and converts stereovision images coming as sent from the monitoring unit 200 on the construction site and the target data images manufactured at the three-dimensional target data storage section 340, so that those images may be compared with each other on the same scale in the same coordinate system.

The video/virtual image display section 330 is of the video see-though type which synthesizes in three dimensions, superposes together, and displays the stereovision images measured on the actual construction site and the CG images as the target data images. The video see-though type is a type that superposes together the actual image taken with the measurement-purpose stereo camera 220 and the CG image representing the computer-prepared target data and shows the resultant image to an observing person. The video/virtual image display section 330 may be any display that can provide 3D images, such as a 3D monitor, 3D projector, HUD, HMD, hologram, etc. The stereovision image shape measuring section 350 measures in three dimensions the stereovision images coming as sent from the data exchanging section 310. Details of the three-dimensional measurement are described for example in reference to FIG. 7 concerning the stereovision image measurement.

Figure 12:
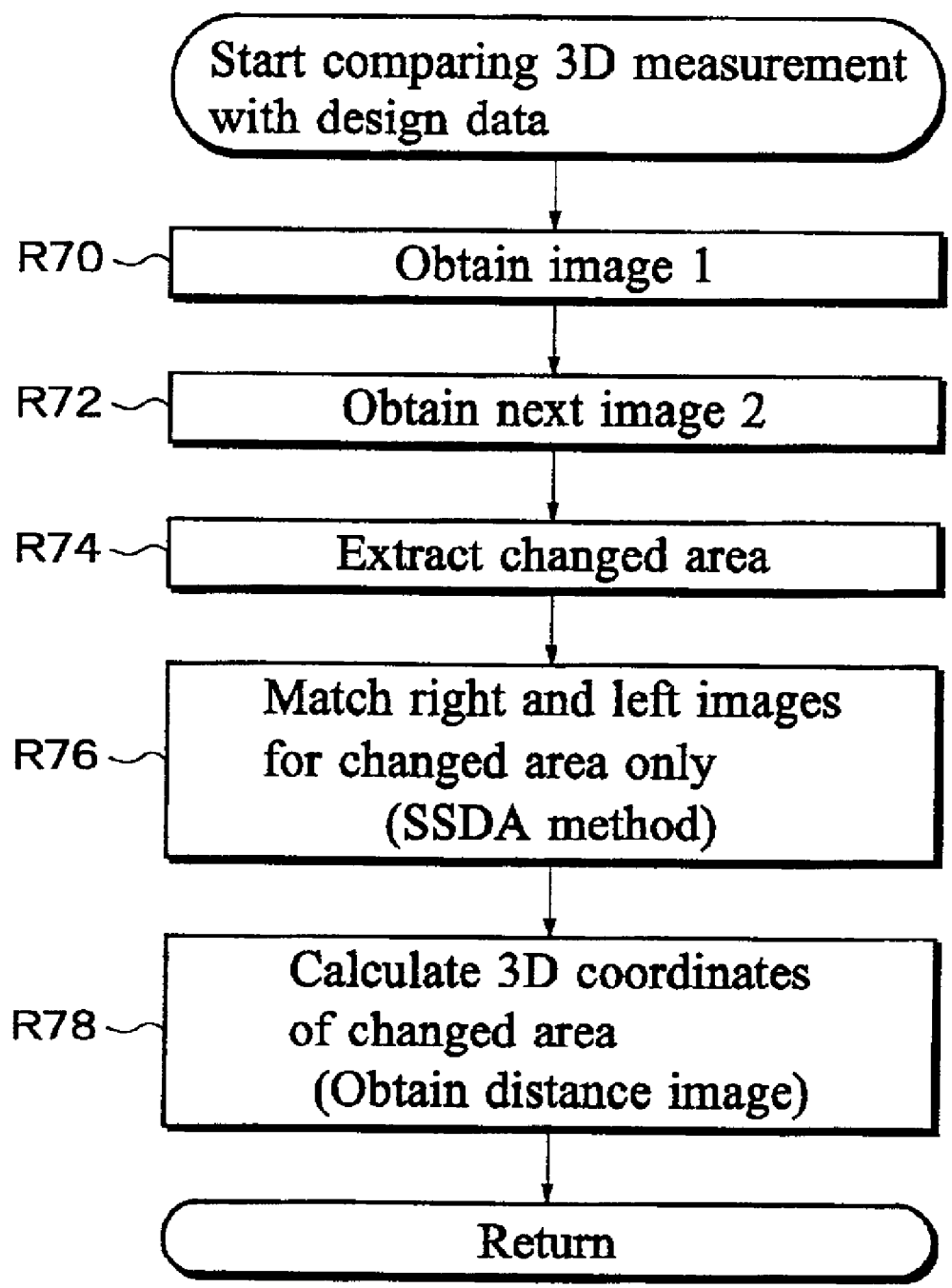
FIG. 12 is for explaining a measurement comparison process flow.

The target data comparison display processing section 360 compares the object shape data with the target data through comparative calculation of the stereovision image taken with the measurement-purpose stereo camera 220 on the construction site and the CG image as the target data image prepared at the three-dimensional target data storage section 340, and causes the result to be reflected on the superposed display on the video/virtual image display section 330. To reflect the comparison result, a measurement comparison process flow shown for example in FIG. 12 is used. The intermediate target data setting means 370 sets an intermediate target data in every construction step of the object. The intermediate target data may be set for example either to values conforming to the daily work target or to the value of every intermediate target for construction process management. With reference to the three-dimensional target data stored in the three-dimensional target data memory the construction plan drafting and correcting means 380 calculates data related to the processing or treatment on the object to the target data according to the comparison result of the target data image comparison display processing section 360.

Figure 2:
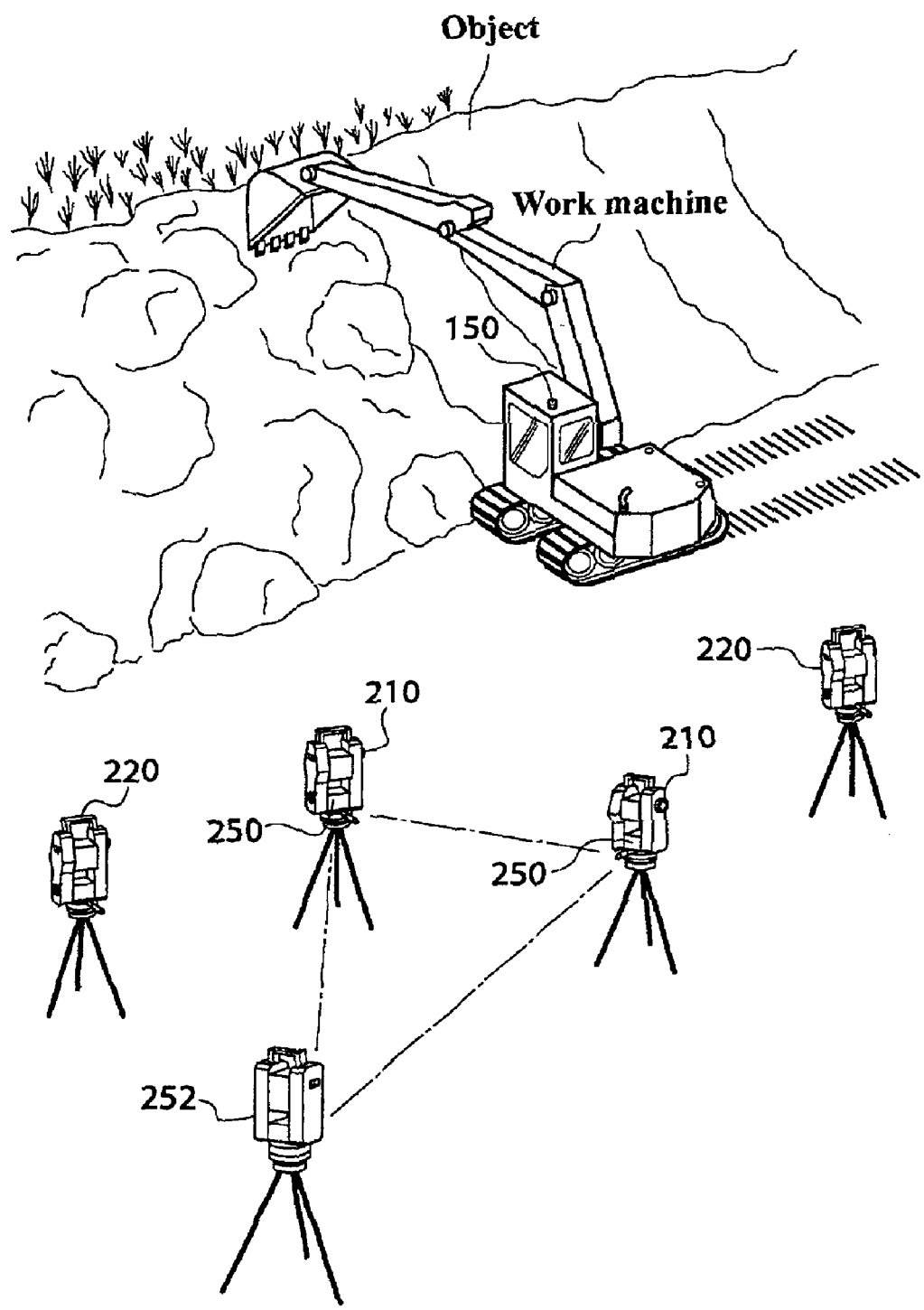
FIG. 2 is a bird's-eye view of the construction display devices used on the construction site.
Figure 3:
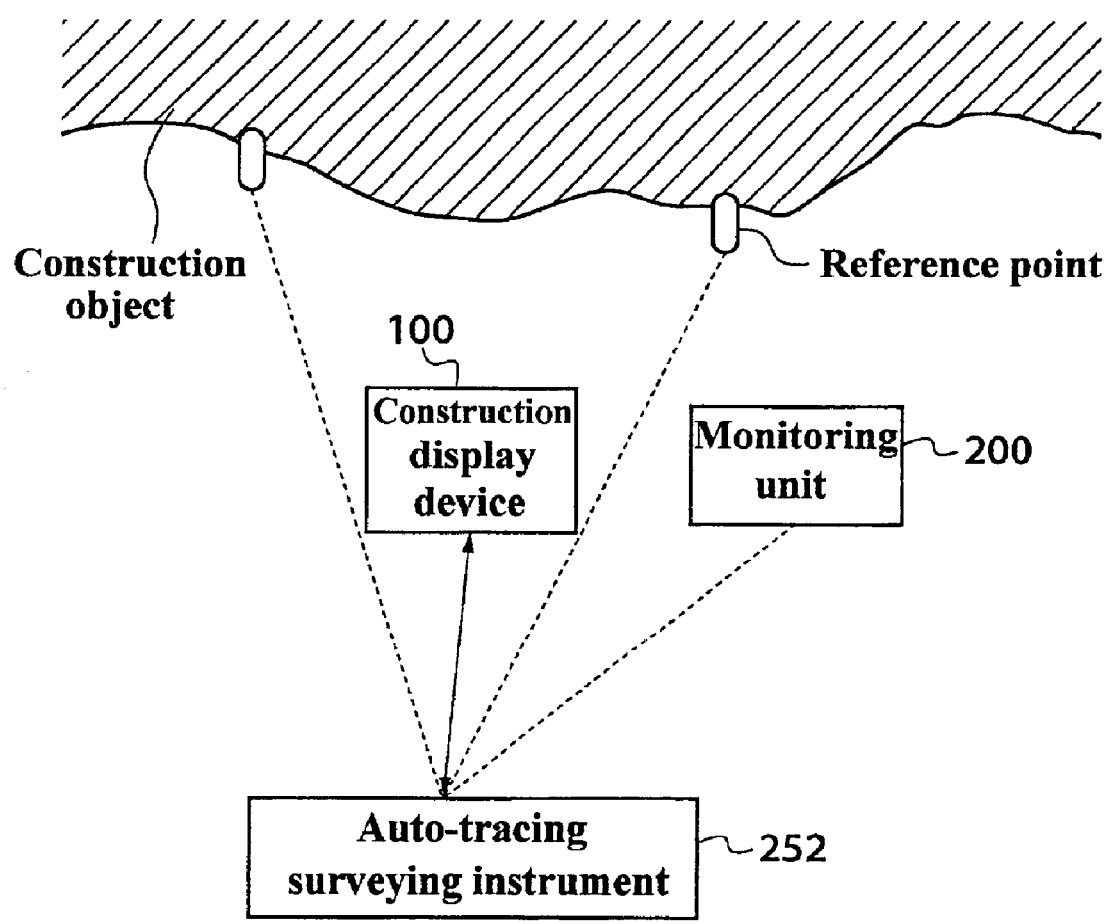
FIG. 3 is a block diagram, showing the first embodiment of use of the construction display device on a construction site.

FIG. 3 is a block diagram, showing the first embodiment of use of the construction display device on the construction site. FIG. 2 is a bird's-eye view of the construction display device used on a construction site. The construction display device 100 is attached either to a work machine such as a power shovel executing construction or to a work machine operator. The position of the construction display device 100 is constantly measured in three dimensions with the automatic tracing type of surveying instrument 252 to align the positions of the image of the construction executing visual point, the design image, and the image of the monitoring unit 200. In areas where video waves can be received from orbiting satellites, the GPS may be used in place of the automatic tracing type of surveying instrument 252 as the construction position taking section 150. Unless the construction area is vast, using the automatic tracing type of surveying instrument results in higher accuracy and reliability of the position data obtained. Choice of the automatic tracing type of surveying instrument or the GPS may be decided appropriately depending on the conditions of construction.

Figure 4:
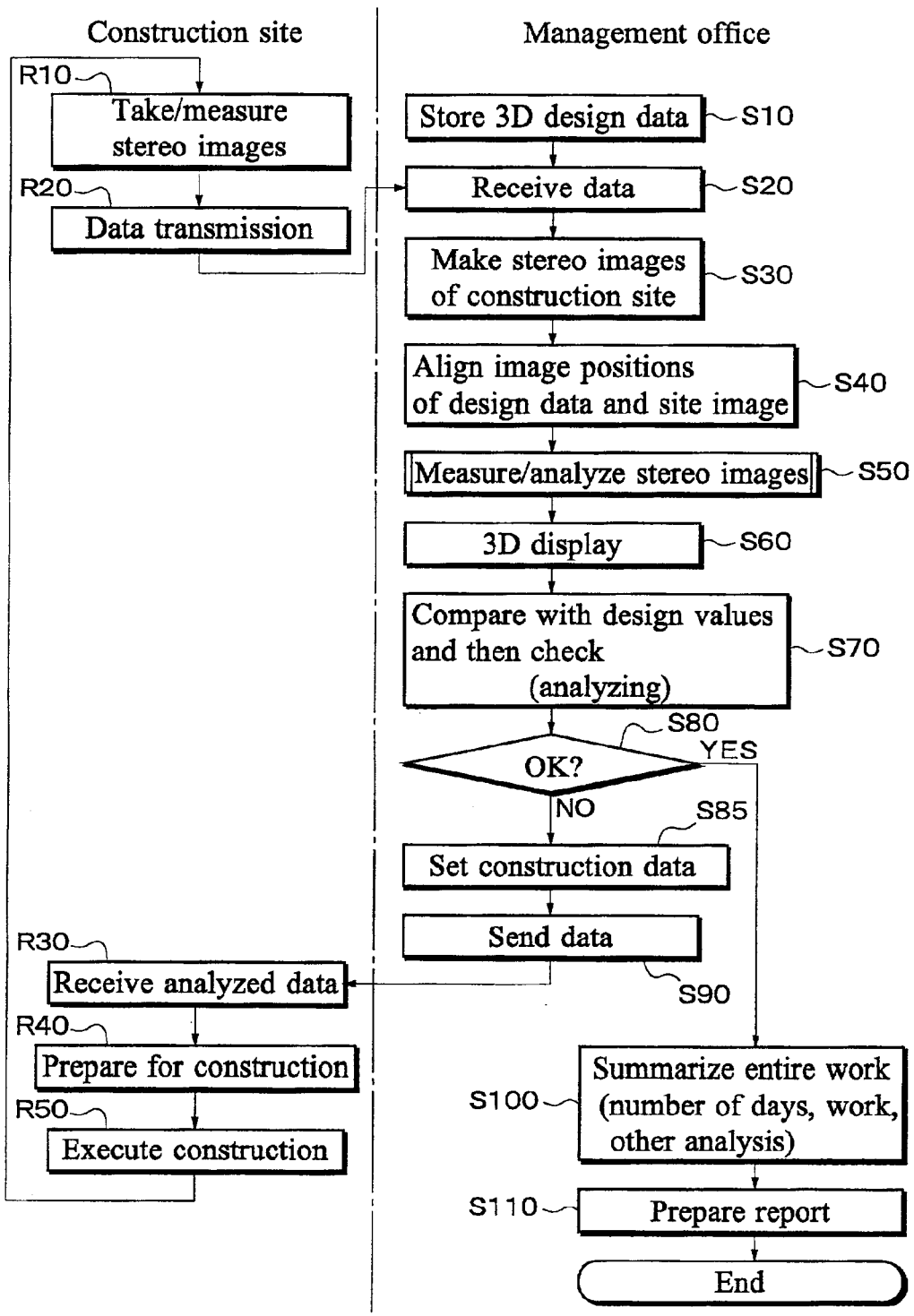
FIG. 4 is a process flow chart of an embodiment of the invention.

Next, the process flow of an embodiment of the invention will be described in reference to the flow chart. FIG. 4 is a process flow chart of an embodiment of the invention. Here, the construction site is assumed to be laid out as shown in FIGS. 2 and 3. As an example, it is assumed that automatic tracing type of surveying instruments are used as the construction position taking section 150 and the camera position taking section 250. By the way, in the case the GPS is used as the construction position taking section 150 and the camera position taking section 250, positions of the construction display device 100 and the monitoring unit 200 are synchronized with an image and GPS data are sent. Here, the GPS data are the data representing the latitude, longitude, and elevation of the place where electric waves are received from orbiting GPS satellites.

First, in the construction management office, three-dimensional target data prepared in advance for the object on which construction is complete are stored in the three-dimensional target data storage section 340 of the construction status measuring device 300 (S10). On the other hand, on the construction site, the monitoring unit 200, the construction display device 100, and a reference point placed on the object are measured with the automatic tracing type of surveying instrument 252 (R10). And the construction operator takes image of the status of the object before construction with the measurement-purpose stereo camera 220. And the construction display device 100 sends out the position information measured with the automatic tracing type of surveying instrument 252 through the data exchanging section 140 (R20). The monitoring unit 200 sends out the image data before the work is applied to the object through the data exchanging section 240 (R20).

Then the construction status measuring device 300 side receives at the data exchanging section 310 the data sent from the construction display device 100 (S20). And the construction status measuring device 300 creates stereovision images of the construction site before the construction is executed (S30), where since a baseline is known in advance, the measurement-purpose stereo camera 220 can create, from the positional relationship with the baseline, stereovision images that can be viewed in three dimensions. Alternatively, even if the baseline is unknown, the stereovision images that can be viewed in three dimensions may be created by carrying out orientation process using reference position data. Here, the orientation process refers to a preparatory process for carrying out stereo-viewing in aerial photogrammetry, in which the position and tilt of the camera are determined. The reference points, six or more in number, suffices for the purpose. The stereovision images that can be viewed in three dimensions refer to the images, with vertical parallax removed, parallel to the object, and called rectified images in the aerial photogrammetry.

Next, the construction status measuring device 300 aligns positions of and synthesizes the target data image and the site image (S40). Here, since the absolute coordinate system of the stereovision images becomes known from the reference point data taken with the automatic tracing type of surveying instrument 252, superposition becomes possible by converting the coordinate system.

Next, the construction status measuring device 300 carries out stereovision image measurement and analysis (S50). Details of the stereovision measurements will be described later in reference to FIG. 7. Next, the construction status measuring device 300 carries out three-dimensional display on the video/virtual image display section 330 (S60). At this time, the stereovision images of the target data and the stereovision images of the measurement-purpose stereo camera 220 are converted to the case of: the baseline length B on the intended visual point side (distance between the measurement-purpose stereo cameras 220), the imaging distance H, and the focal length f of the lens. Incidentally, visual points of the construction stereo cameras 210 or the visual points of the construction display device 100 may be used in place of the visual points of the measurement-purpose stereo cameras 220.

Figure 7:
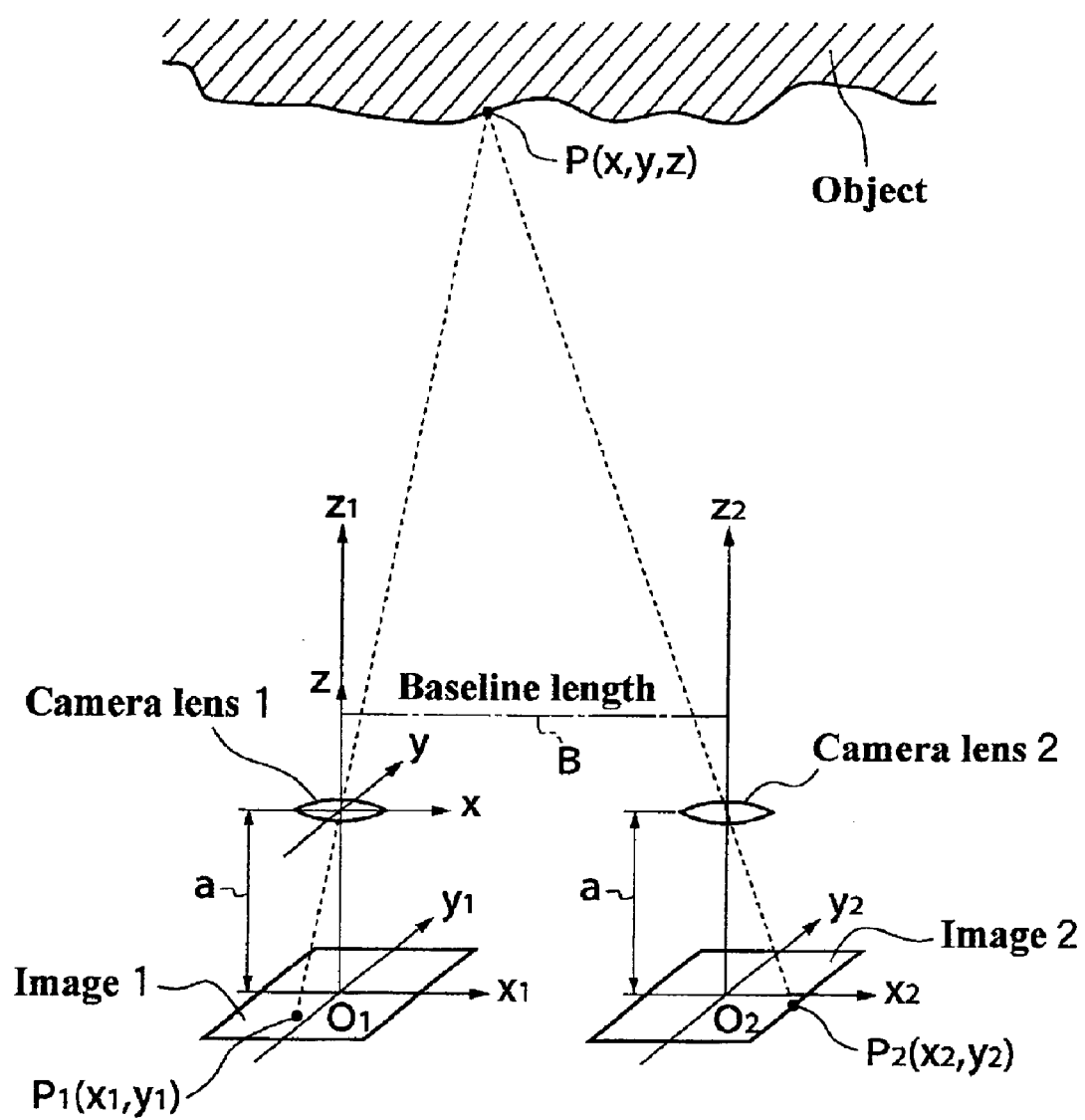
FIG. 7 is a drawing for explaining the principle of stereovision image measurement.

The image conversion process in the image calculation processing section 320 is described below. In the image calculation processing section 320, it is assumed that an x-y-z coordinate system as shown in FIG. 7 is used. When the resolution in the front-and-rear and right-and-left directions is assumed to be $\Delta xy$ and the resolution in the depth direction z is assumed to be $\Delta z$, the following equations are derived:

$$\Delta xy = H \cdot \delta p / f \quad (1)$$

$$\Delta z = H^2 \cdot \delta p / (B \cdot f) \quad (2)$$

where $\delta p$ is the pixel resolution. In this way, the stereovision images of the target data and the stereovision images of the measurement-purpose stereo camera 220 may be compared with each other at the visual point of the construction operator.

Next, the construction status measuring device 300 carries out comparative examination of the target data and the current status data of the object (S70). The images obtained by converting the stereovision images of the measurement-purpose stereo cameras 220 that represent the current status data of the object using the image calculation processing section 320 are referred to as restructured images. Since the volume, exact shape and dimensions are known from the restructured images, the object may be compared with the target data. As for the amount of earth to be handled, it can be known quantitatively by taking the differential between the object and the target data. Comparison of shapes enables examination of how to proceed with the construction and the choice of the method of construction. Amount of construction may be estimated and examined from the amount of earth handled and the time taken.

Next, if the work proves to be complete as a result of the comparison with the target data, the process of the construction status measuring device 300 goes to S100. If the work is not complete, it goes to S85 (S80). In S85, next construction data are set with the construction plan drafting and correcting means 380. That is, next intended construction position data are set. The position data in three dimensions may be set directly to the target data obtained from the design drawing of the final stage, or for example the next construction amount is determined from the result of examination in S70 and, with its position assumed to be the final target (drawing) of the next construction, the final target data may be set. In that way, daily construction amount becomes clear, so that the construction can be executed exactly as planned. And the construction status measuring device 300 transmits those analysis data to the construction site (S90).

Next at the construction site, the analysis data transmitted from the construction status measuring device 300 are received with the construction display device 100 (R30). And the construction is prepared using the analysis data (R40). The work machine or the construction operator moves to the construction site planned and executes the construction (R50). Details at R50 will be described concerning 'real-time construction flow' shown in FIG. 8. When the construction is complete, the process goes back to R10 where the construction results are measured and compared with the design drawings as the target data, and examined. If the construction proves not to be complete, the construction is continued and the routines of S20 to S90 and R10 to R50 are repeated until the construction is complete.

When the entire construction is over, the construction management office prepares the summary description of the entire construction from the measurement data (S100). For example, the number of days, the amount of construction, man-hours, machines and materials used, and others are enumerated and calculated using the construction status measuring device 300. And a construction report is prepared at the construction management office (S110). In this way, since the daily status and the final status of construction can be managed systematically, visually, and quantitatively with the construction status measuring device 300, construction progress relative to the plan can be estimated easily. It is possible for example to take appropriate measures when the construction is delayed relative to the plan.

Figure 5:
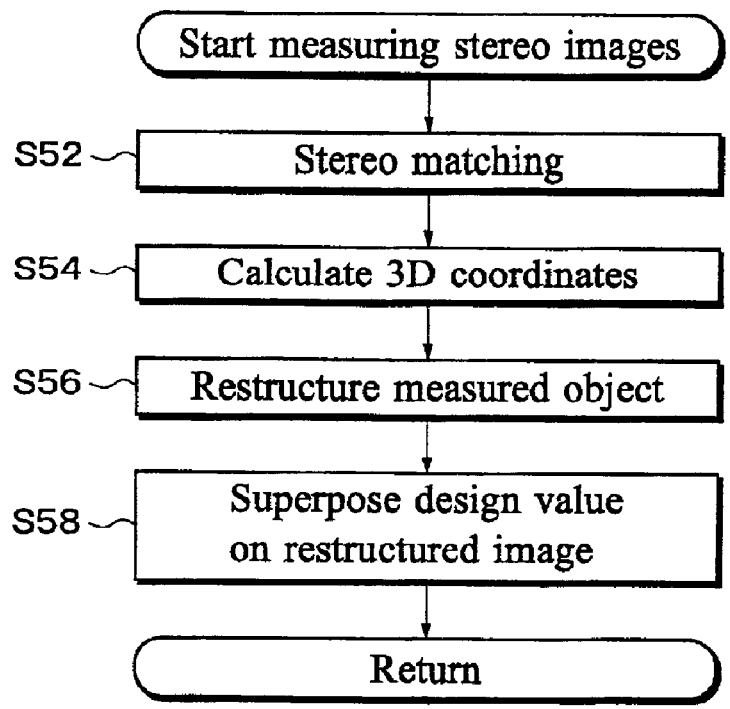
FIG. 5 is a flow chart for explaining the details of stereovision image measurement.

FIG. 5 is a flow chart for explaining the details of stereovision image measurement. The stereovision image measurement is shown in S50 of FIG. 4. First, using the rectified images produced at S30, stereovision matching is carried out (S52). The stereovision matching may be carried out using an algorithm such as the image correlation processing. Since special accuracy is required here, the normalizing correlation processing among others is used.

Explanation of Normalization Correlation Processing

Figure 6:
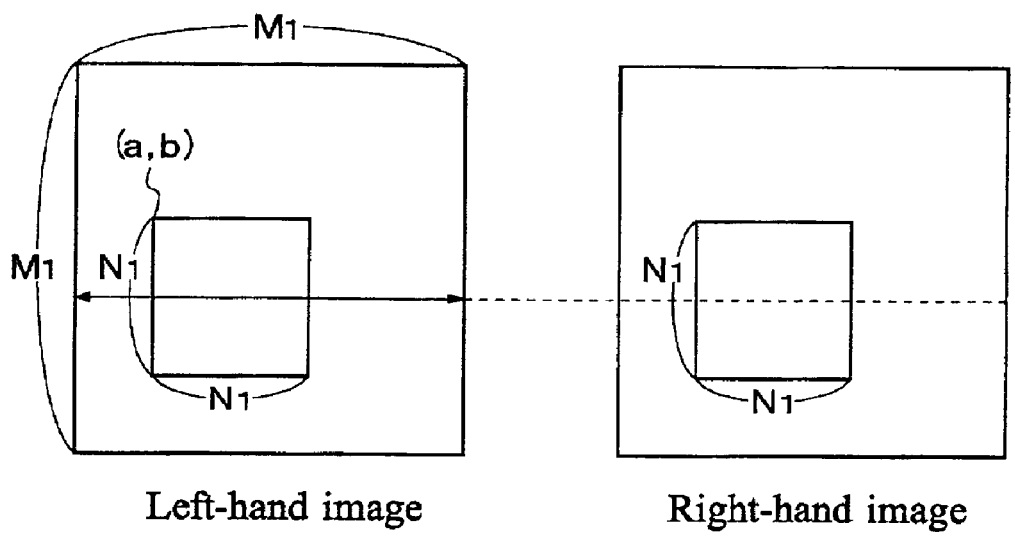
FIG. 6 is an explanatory drawing of a normalizing correlation process.

FIG. 6 is an explanatory view of the normalizing correlation processing. As shown, for example when the position of N1×N1 pixel area on the right side image is to be searched on the left side image, a corresponding area on the left side image is detected using the image of N1×N1 pixel as a template image. In the case orientation and rectification processing are already applied, the corresponding point can be detected only by searching on the same line on the left side image.

In the search area (left side image), when the position of the template image is determined so that C(a, b) in the equation below becomes a maximum, the search is assumed to be made to the template image:

$$C(a, b) = \sum_{ml=0}^{Nl=1} \sum_{nl=0}^{Nl=1} \frac{(I(a, b)(m_1, n_1) - I)(T(m_1, n_1) - T}{\sqrt{I\sigma ab T\sigma}} \quad (3)$$

where, $$I = \frac{1}{N_1^2} \sum_{ml=0}^{Nl=1} \sum_{nl=0}^{Nl=1} I_{(a,b)}(m_1, n_1) \quad (4)$$

$$T = \frac{1}{N_1^2} \sum_{ml=0}^{Nl=1} \sum_{nl=0}^{Nl=1} T(m_1, n_1) \quad (5)$$

$$I_{\sigma ab} = \frac{1}{N_1^2} \sum_{ml=0}^{Nl=1} \sum_{nl=0}^{Nl=1} \{I_{(a,b)}(m_1, n_1) - I\}^2 \quad (6)$$

$$T_\sigma = \frac{1}{N_1^2} \sum_{ml=0}^{Nl=1} \sum_{nl=0}^{Nl=1} \{T(m_1, n_1) - T\}^2 \quad (7)$$

$I_{(a,b)}(m_1, n_1)$: part of input image
$T(m_1, n_1)$: template image

Incidentally, the templates and the search areas of the left side image and the right side image may be interchanged. In the case of multiple stereovision images, the above process is applied to every pair of stereovisions to determine the corresponding areas. From the results of stereovision matching, three-dimensional coordinates on respective images are calculated (S54).

Principle of Stereovision Image Measurement

FIG. 7 is an explanatory view of the principle of the stereovision image measurement. Any point p(x, y) on the object is projected through a camera lens 1 as a point P1(x1, y1) on an image 1, and through a camera lens 2 as a point P2(x2, y2) on an image P2. The images 1 and 2 are already corrected for orientation and rectification. The optical axes z1 and z2 are parallel to each other, with the distances from the two principal points to the CCD (charge-coupled devices) surfaces being identical 'a', and with the CCDs being converted to be placed perpendicular to the optical axis. Assuming the distance between the two optical axes (baseline length) to be B, the following relationship between the points P1(x1, y1) and P2(x1, y1) is holds true:

$$x1 = ax/z \quad (8)$$

$$y1 = y2 = ay/z \quad (9)$$

$$x2 - x1 = aB/z \quad (10)$$

It is assumed, however, that the origin of the entire coordinate system is positioned at the principal point of the lens of the camera 1. Using the value of z determined from the equation (10), values of x and y are determined with the equations (8) and (9). That is, since the corresponding points (x1 and x2) of the right and left images are known by the process of S52, the distance z from the lens principal point of the camera 1 to any point p on the object can be determined.

Referring again to FIG. 5, the measurement object is restructured using the three-dimensional coordinate system obtained (S56). That is, combining the three-dimensional coordinates obtained by the normalizing correlation processing and the stereovision method according to the current status of the construction site, expression such as the wire frame becomes possible, and the volume such as the amount of processed earth can be obtained. Next, superposition of the target data image and the restructured image is carried out. This means conversion of position coordinates provided on the construction site to actual size required for the work by the known reference point data (S58). Thus, the stereovision image measurement is performed.

Figure 8:
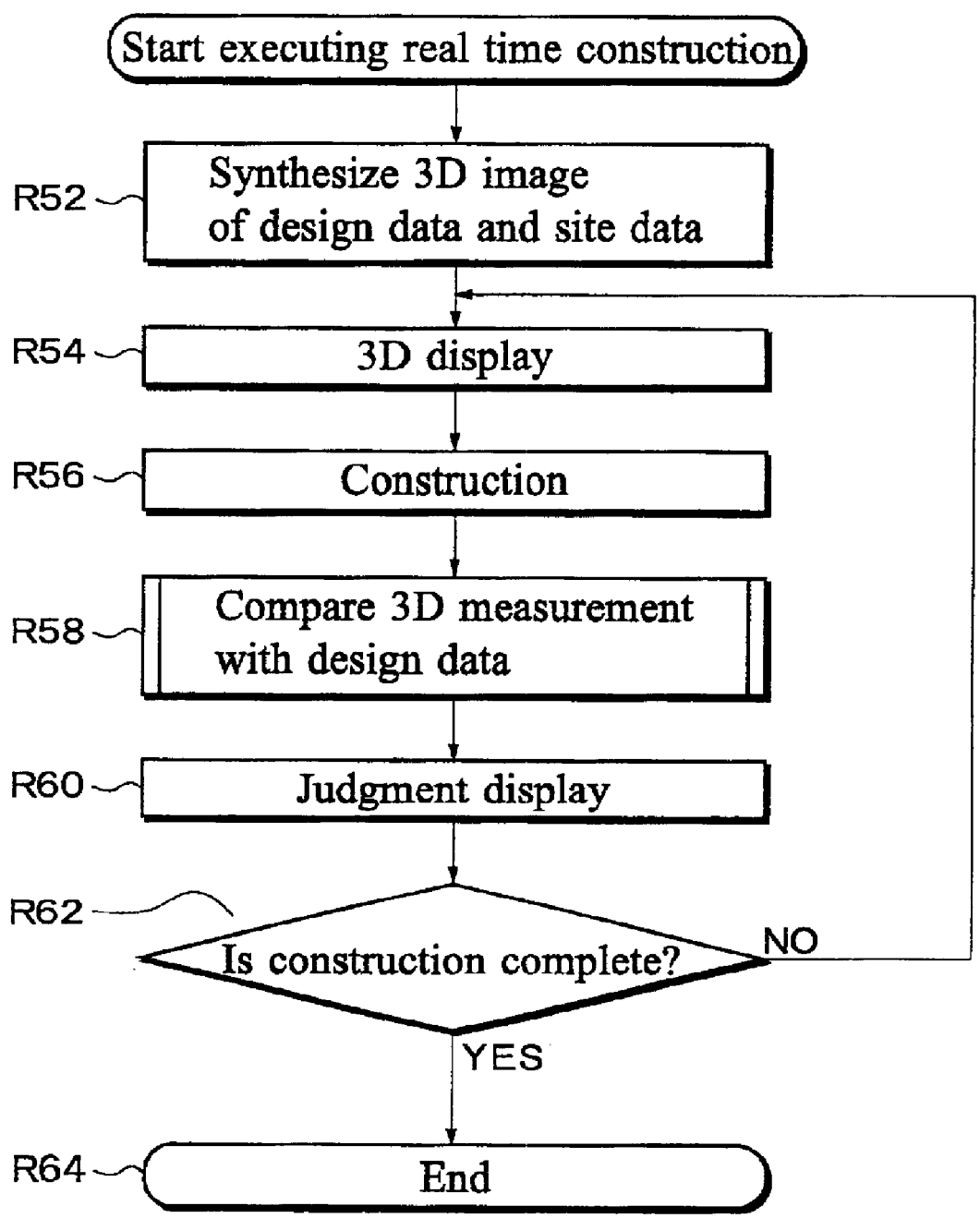
FIG. 8 is a drawing for explaining the real time construction flow on the construction site.

FIG. 8 is a drawing for explaining the real time construction flow performed on the construction site. The real time construction flow is shown at R50 in FIG. 4. In the construction display device 100, images are converted with the image processing section 120 using the analysis data received at R30 in FIG. 4 and the data of the attitude sensor 130 and the three-dimensional position of the construction display device 100 to the visual point position of the construction display device 100 (R52). In this case, if the transmitted data are already converted to the visual point of the construction display device 100, further conversion is not required.

Figure 9:
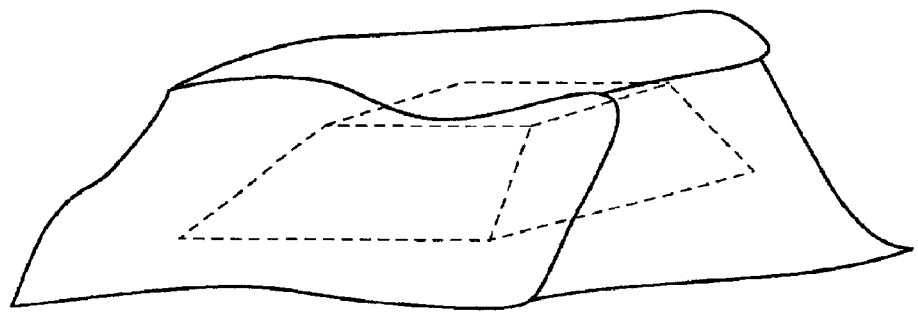
FIG. 9 shows an example of synthesized image before construction.
Figure 10:
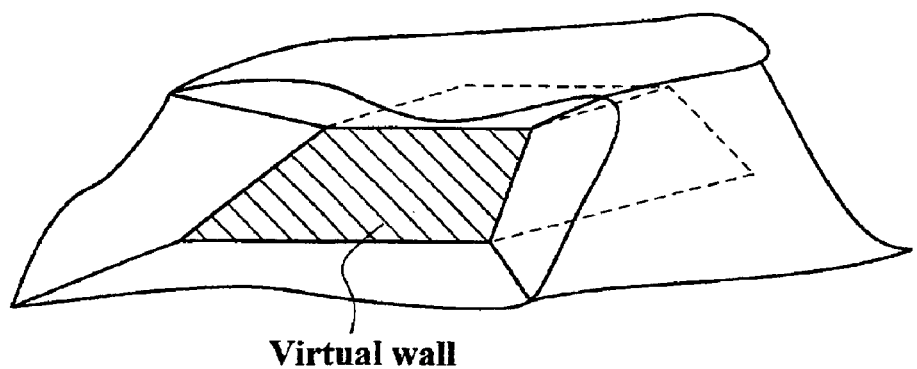
FIG. 10 shows the state in which a face of slope to be target data has appeared on a sloped surface of a natural ground after starting the construction.
Figure 11:
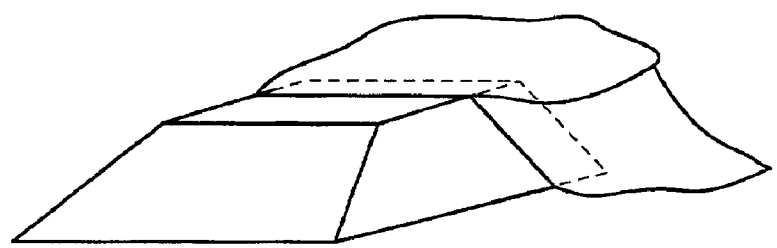
FIG. 11 shows the state in which most of a pyramid shape to be target data has appeared on a raised piece of ground, an object of a construction work, as the construction has progressed to some extent.

Next, three-dimensional display is carried out with the real image/virtual image observing section 110 (R54). FIG. 9 shows an example of synthesized image before construction. Since no construction is executed yet on the object shown with the three-dimensional display image in the real image/virtual image observing section 110, the initial ground shape data represent the solid lines while the target data represent the broken lines in FIG. 9. Here, the target data represent a truncated pyramid, with the initial ground shape data representing a raised piece of ground greater than the shape represented with the target data. As the construction goes on, the shape of the ground changes as shown in FIGS. 10 and 11. FIG. 10 shows the status at the beginning of the construction when a side corresponding to the target data has appeared as a sloped side of the object, the raised piece of ground. FIG. 11 shows the status in the course of the construction when most part of the truncated pyramid, the target shape, has appeared. Thus, the construction may be executed to the natural ground while being compared with the target data-based shape.

And the construction operator executes the construction using the work machine (R56). And the construction operator carries out measurement and comparison process using the monitoring unit 200 (R58). Details of the measurement and comparison process will be described later in reference to FIG. 12. And judgment display is carried out (R60). Details of the judgment display process will be described later in reference to FIG. 13. The construction operator repeats the construction while watching the video/virtual image display section 330 until the above process is over exactly as represented with the target data (R62).

An advantage of executing construction by using the real image/virtual image observing section 110 is that the construction operator can recognize the processed ground reaching the target data status while watching both the real image/virtual image observing section 110 and the construction site during the construction, without carrying out the construction in excess. Another advantage is that, as the processed ground surface approaches the target data status, a virtual wall appears and so the remaining amount of construction can be visually recognized. The virtual wall display, unlike mere numerals, provides visual recognition, facilitates operation of the work machine, and results in speedy and accurate construction. Not only when digging the ground but also filling or constructing something, the construction may be carried out while watching and confirming 3D display of the target data position and the remaining amount of construction on the real image/virtual image observing section 110.

FIG. 12 is for explaining the measurement comparison process flow. The measurement comparison process flow is shown at the step R58 in FIG. 8. First, the image 1 is taken with the construction stereo camera 210 (R70). Next, the image 2 is taken with the construction stereo camera 210 (R72). Then, a changed area is extracted with the motion image processing section 230 by subtracting the image 1 from the image 2 (R74). Then, matching of right and left images is carried out only for the changed area (R76). Since this matching process must be in real time, image correlation processing is carried out by the sequential residue analysis (SSDA) method.

SSDA Method

Since processing motion images in real time is required here, the SSDA method is used to increase the processing speed. The image correlation processing is carried out according to the same principle as that of the normalizing correlation processing shown in FIG. 6 to determine a point in the left image corresponding to the right image or vice versa. Equations of the SSDA method are as follows:

$$R(a, b) = \frac{1}{N_1^2} \sum_{m1=0}^{N1=1} \sum_{n1=0}^{N1=1} |I_{(a,b)}(m_1, n_1) - T(m_1, n_1)| \quad (11)$$

where $T(m_1,n_1)$: template image, $I_{(a,b)}(m_1,n_1)$: part of the object image, (a, b): left upper coordinates of the template image and R(a, b): residue.

Here, the position sought is the one where the residue R(a, b) becomes a minimum. To increase the processing speed, it is carried out such that the addition with the equation (11) is stopped when the value of R(a, b) exceeds the minimum of the past residue, and moves on to the left upper coordinates (a, b) of the next template. Thus, motion images can be coped with. In the case plural cameras are used, real time process can be carried out by applying the SSDA method to respective pairs of stereovision images.

Figure 13:
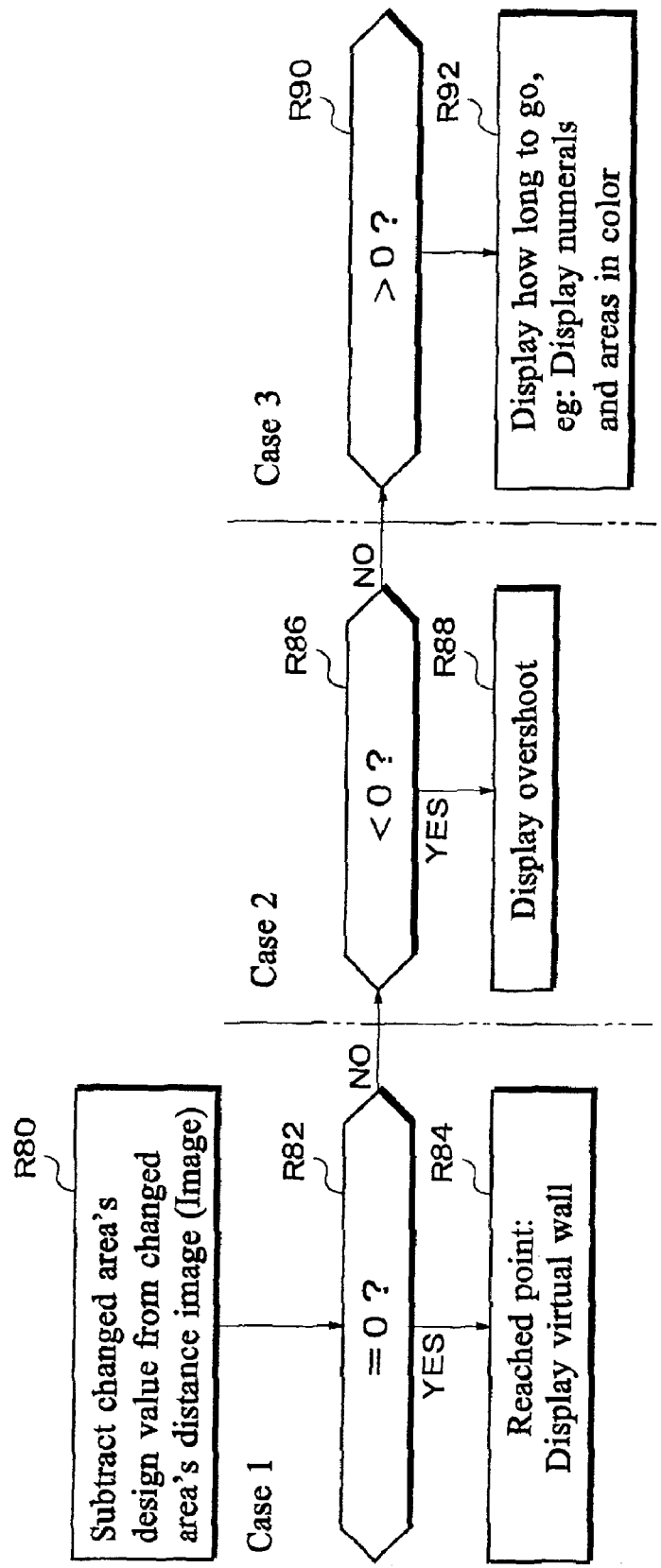
FIG. 13 is for explaining a judgment display process flow.

Next, using the corresponding points of the right and left images obtained, three-dimensional coordinates of an area are calculated (R78). This determines the distance to the changed part of the object being processed (distance image). Judgment display is made back to R60 of FIG. 8. The judgment display process becomes as shown in FIG. 13. FIG. 13 is for explaining the judgment display process flow. The judgment display process flow is shown at the step R60 of FIGS. 8 and 12. First, the target data of the changed area (processed area) are compared (to determine difference) using the distance images of the changed area (R80).

FIG. 14 is for explaining comparison of the target data of the changed area using the distance image of the construction area, with (A) showing the state before executing construction and (B) during the construction. Assuming the distance to the position on the object being processed to be 'a' and the target data to be 'b,' (a−b) is calculated at each point in the changed (processed) area on the image. Using the results, the following three process displays are carried out.

Case 1: a−b=0 (R82). This condition means that the target data are reached, and a virtual wall is displayed at the reached point in the changed area (R84). That is, the display of the virtual wall shown in FIG. 10 means that the designed position is reached. In the case the reached point is part of the target data, it is preferable to indicate only that part in a different color, indicating that the part need not be processed any more.

Case 2: a>b (R86). This condition means that the target data are exceeded and a warning display is shown (R88). In this case, the area in which the target data are exceeded may be indicated in a different color in two dimensions together with a message display.

Case 3: a<b (R90). This condition means that the target data are not reached yet (R92). The construction may be facilitated by indicating on the construction display device 100 the amount of construction yet to be executed when the status of the object approaches the target data. Such an indication can remarkably improve the construction efficiency, by making the indication not only in figures but also in different colors in two dimensions by the classified distances to the target data position of the object surface. Judgment criteria may be set for example by colors of green, yellow, and red according to threshold values of (a−b) at respective points. These virtual walls may be displayed in front of or behind the object or in see-through color depending on the distance judgment. For example the part not yet reached may be indicated in transparent red.

Next as the second embodiment of the invention, work of excavating an archaeological site will be described. To carry out excavation and examination of the site, a three-dimensional drawing of the site is made from the data taken with measurement-purpose stereo cameras, positions of buildings or the like that must be under the ground are estimated, and their positions are excavated.

Figure 15:
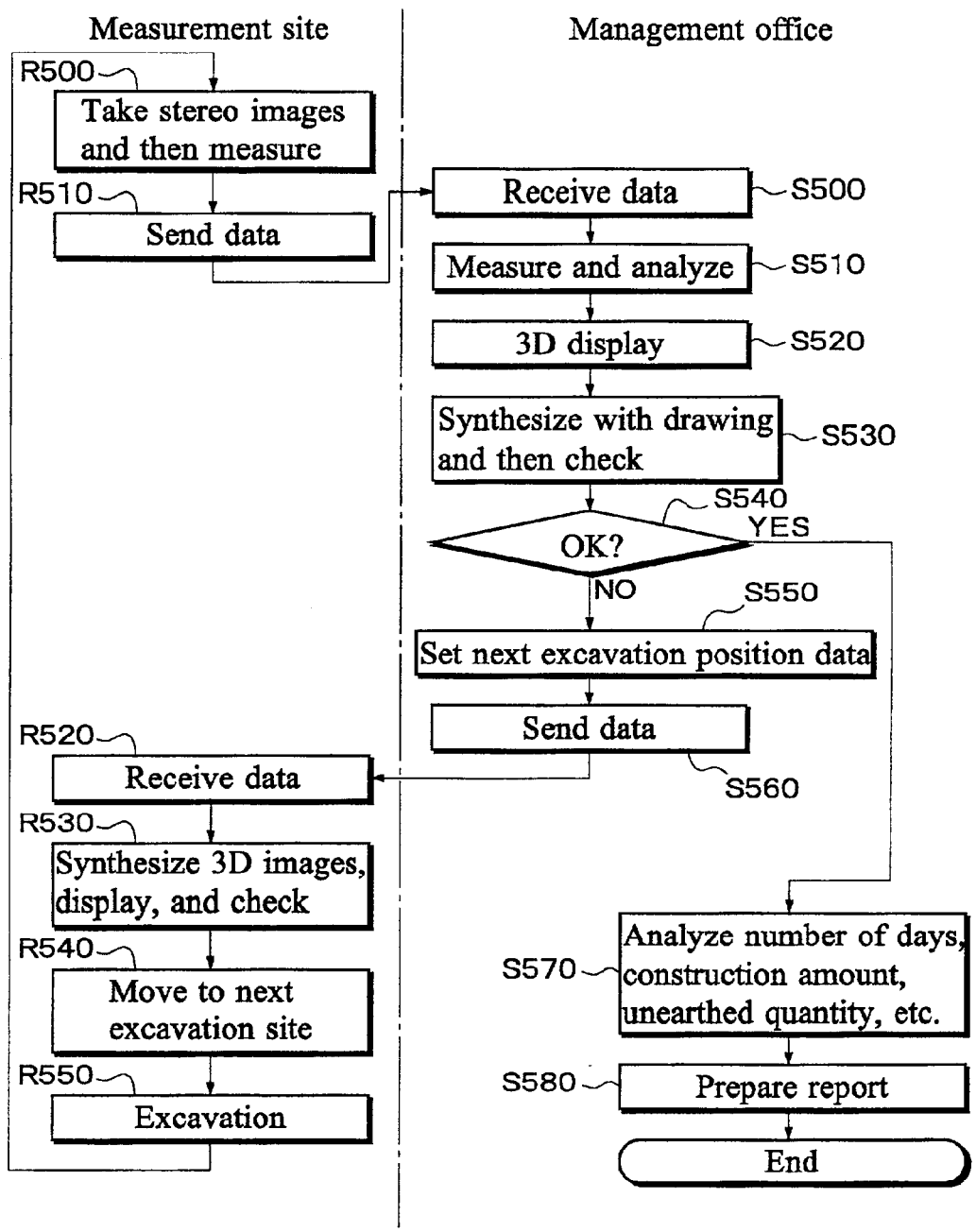
FIG. 15 is a process flow chart when the invention is applied to excavation for investigating an archaeological site.

FIG. 15 is a process flow chart when the invention is applied to excavation for investigating an archaeological site. First, estimated three-dimensional data of the archaeological site are stored in the three-dimensional target data storage section 340. On the other hand, the site to be excavated is photographed with the measurement-purpose stereo cameras 220. Reference points, positions of the construction display device 100 and the monitoring unit 200 are measured with the automatic tracing type of surveying instrument 252 (R500). The data of the measured positions are sent to the construction status measuring device 300 (R510).

The construction status measuring device 300 receives the sent position measurement data at the data exchanging section 310 (S500). The construction status measuring device 300 carries out measurement and analysis on the basis of the received position measurement data (S510). In this case, at the image calculation processing section 320, stereovision images are produced from the stereovision images and reference point data of the automatic tracing type of surveying instrument 252, and three-dimensional coordinates are calculated by carrying out stereovision matching. These processes are similar to those of S30 to S50 of FIG. 4. The three-dimensional data produced are displayed on the video/virtual image display section 330 (S520).

Here, the stereovision images of the target data and the stereovision images of the measurement-purpose stereo cameras 220 are converted to those under the conditions of: the baseline length (distance between cameras) B on the side of intended visual point, imaging distance H, and the focal length f of the lens, and displayed. Here, the estimated three-dimensional data or the drawing of the archaeological site stored in advance in the three-dimensional target data storage section 340 and the measured data of the object, the excavated site, are superposed and displayed in three dimensions on the video/virtual image display section 330 and examined (S530). If no estimated three-dimensional data are present in advance, estimation is made at S530.

If the excavation proves to be unnecessary as a result of the examination, the process goes to S570; if necessary to S550 (S540). Then, next excavation position data are set while viewing the 3D display on the video/virtual image display section 330 (S550). If the excavation position data are different from those estimated, they are corrected and set. The data are converted so that stereovision images may be displayed at the visual point on the side of real image/virtual image observing section 110. When the excavation position is set, its estimated position and the position data on the drawing are sent to the side of the construction display device 100 (S560).

The construction display device 100 receives the data at the data exchanging section 140 (R520). Matching of the excavation position is carried out at the image processing section 120 using the position data of the construction display device 100 and synthesized display is shown on the real image/virtual image observing section 110 (R530). The work operator moves to the excavation site while watching the display on the real image/virtual image observing section 110 (R540). Then the work operator carries out excavation (R550). The sequence of the excavation work here is similar to that of the real time execution flow chart of FIG. 8. The excavation work by the work operator is carried out according to the estimated three-dimensional data. When the work is over, the work operator carries out again stereovision imaging (R500). The process after R510 is similar to that from S500 on described before.

When the work is over, the total number of work days, the amount of work, the number of unearthed articles, and others are collectively analyzed (S570). And the person in charge of controlling the excavation and investigation of the archaeological site makes a report (S580). In this way, since the actual work may be carried out while visually comparing with the estimated three-dimensional images using the real image/virtual image observing section 110, work efficiency is very much improved.

Figure 16:
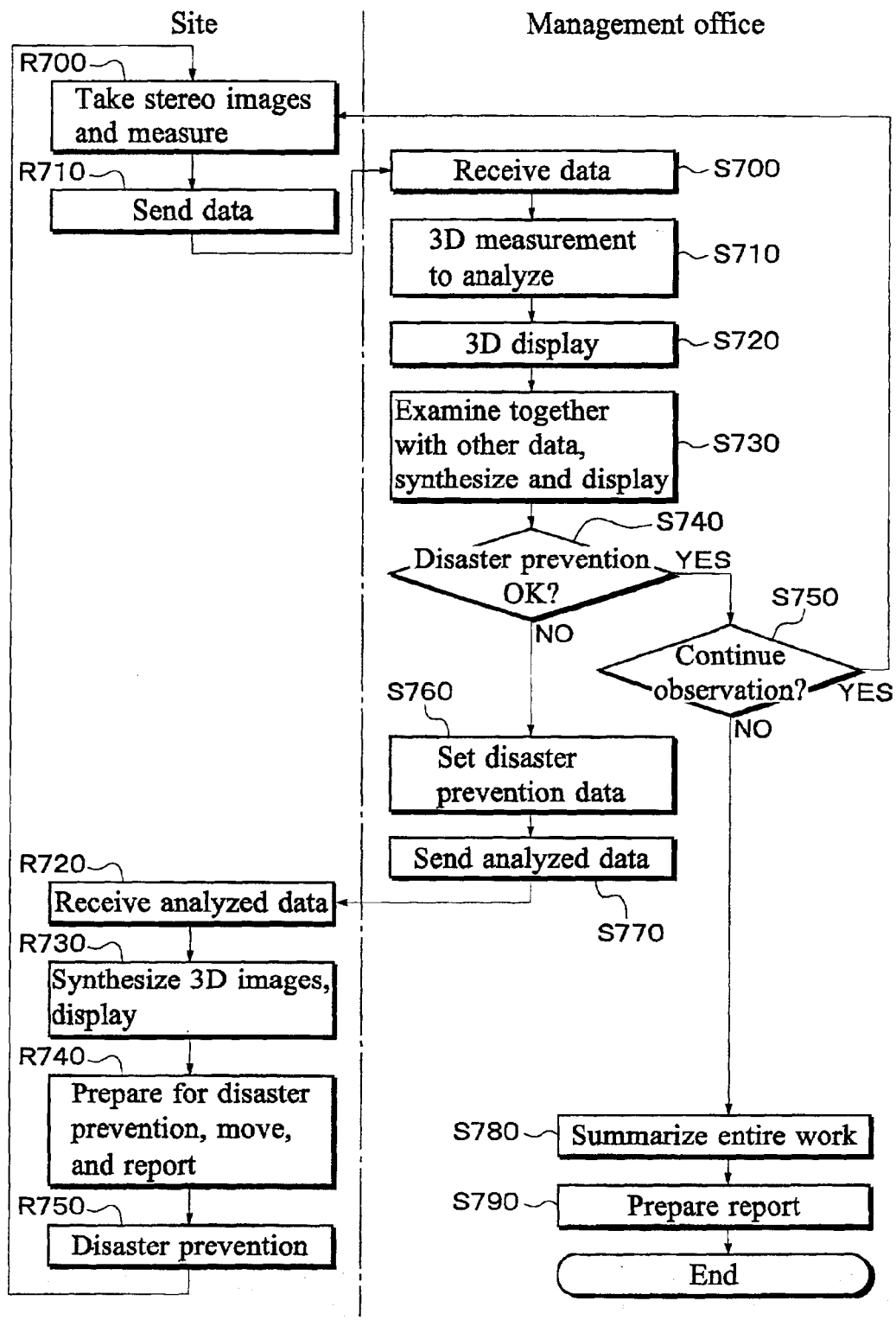
FIG. 16 is a process flow chart when the invention is applied to disaster prevention.

FIG. 16 is a process flow chart when the invention is applied to disaster prevention. First, stereovision images of a site are taken with the measurement-purpose stereo cameras 220 (R700). Positions to be reference points on the site are taken in three dimensions with the automatic tracing type of surveying instrument 252, or with an automatic tracing type of surveying instrument without prisms when the site is too dangerous for human access. The construction display device 100 in this case is preferably one that can be remotely controlled. Position measurement data are transmitted at the data exchanging section 140 (R710).

Then, the construction status measuring device 300 receives the transmitted position measurement data at the data exchanging section 310 (S700). Three-dimensional measurement and analysis are carried out in the image calculation processing section 320 using the position measurement data (S710). These processes are similar to those of S30 to S50 shown in FIG. 4. In the case previously measured data are available in S710, their region of change and the amount of change are extracted and determined from differences obtained from the images. And three-dimensional images are shown on the video/virtual image display section 330 (S720).

Here, the stereovision images of the target data and the stereovision images of the measurement-purpose stereo cameras 220 are converted to those under the conditions of: the baseline length (distance between cameras) B on the side of intended visual point, imaging distance H, and the focal length f of the lens, and displayed. The person in charge of disaster prevention examines the locations to be reinforced in consideration of various information on weather, ground, etc. while watching the display on the video/virtual image display section 330, synthesizes those positions and construction information with the three-dimensional data, and displays them (S730). In the case previous measurement data are available, measurement change regions and past situations are superposed over the video/virtual image display section 330 and displayed in three-dimensions for examination. In the case measures against disaster are not required, the process goes to S750. If not required, it goes to S760 (S740).

In the case measures against disaster are required, a construction drawing is prepared and its three-dimensional data are set (S760). And the data are converted so that stereovision images may be displayed at the visual point on the side of the real image/virtual image observing section 110. And the three-dimensional data set are transmitted through the data exchanging section 310 (S770). Then, the construction display device 100 receives the transmitted three-dimensional data at the data exchanging section 140 (R720). The person in charge of disaster prevention puts together the position information of the construction display device 100 and the analysis data, displays them on the real image/virtual image observing section 110 to confirm the estimated location of disaster prevention construction (R730). And the person in charge of disaster prevention moves to the site of disaster prevention. Notification and display of information on dangerous areas, etc., if required on the site, are made (R740). And the person in charge of disaster prevention carries out the disaster prevention construction (R750). The disaster prevention construction here is similar to that of the flow chart of the real time construction shown in FIG. 8.

When the disaster prevention construction is over, stereovision images are taken to measure and examine the current status of the site, and data are transmitted (R700). Procedure thereafter is the repetition of S700. Since the disaster prevention construction is complete, whether or not observation of the disaster prevention area is to be continued in preparing for future disaster is determined (S750). If the observation is to be continued, the process goes back to R700 to repeat the steps from R700 to S740 of monitoring and measuring the amount of change. In the case the possibility of a disaster is found to become large during the observation, the process goes to R760 to intensify prevention measures.

When the disaster prevention construction is complete and the observation becomes unnecessary, the entire construction is summarized (S780). Here, the construction amount, the number of days taken, and the man-hours are calculated from the data up to the time. A report is written to finish the process (S790).

Figure 17:
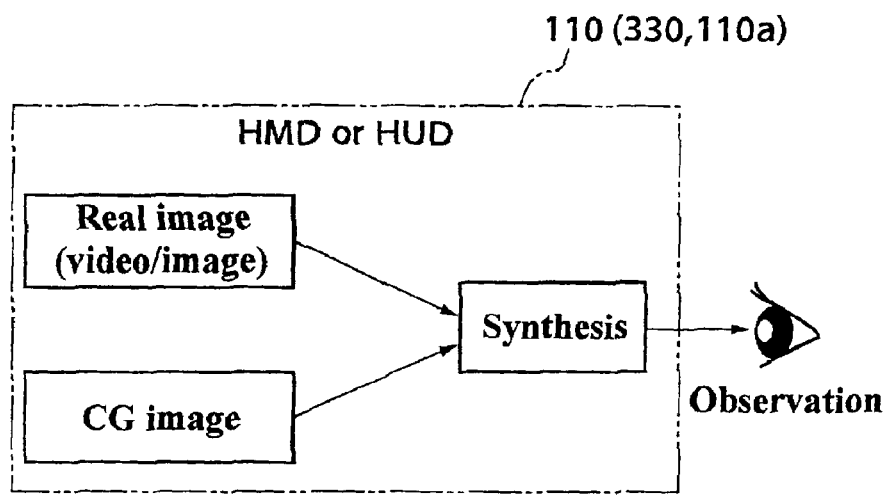
FIG. 17 is for explaining a head-up display (HUD) or head-mount display (HMD) for use in real image/virtual image display section and video/virtual image display section.

FIG. 17 is for explaining a head-up display (HUD) or head-mount display (HMD) for use in real image/virtual image display section and image/virtual image display section. As described before, the HUD or the HMD comes in the optical see-through type and the video see-through type. The HUD or HMD of the optical see-through type is constituted to project CG images such that real images can be seen through and that the construction operator can observe the real images in contrast to the CG images.

Figure 18:
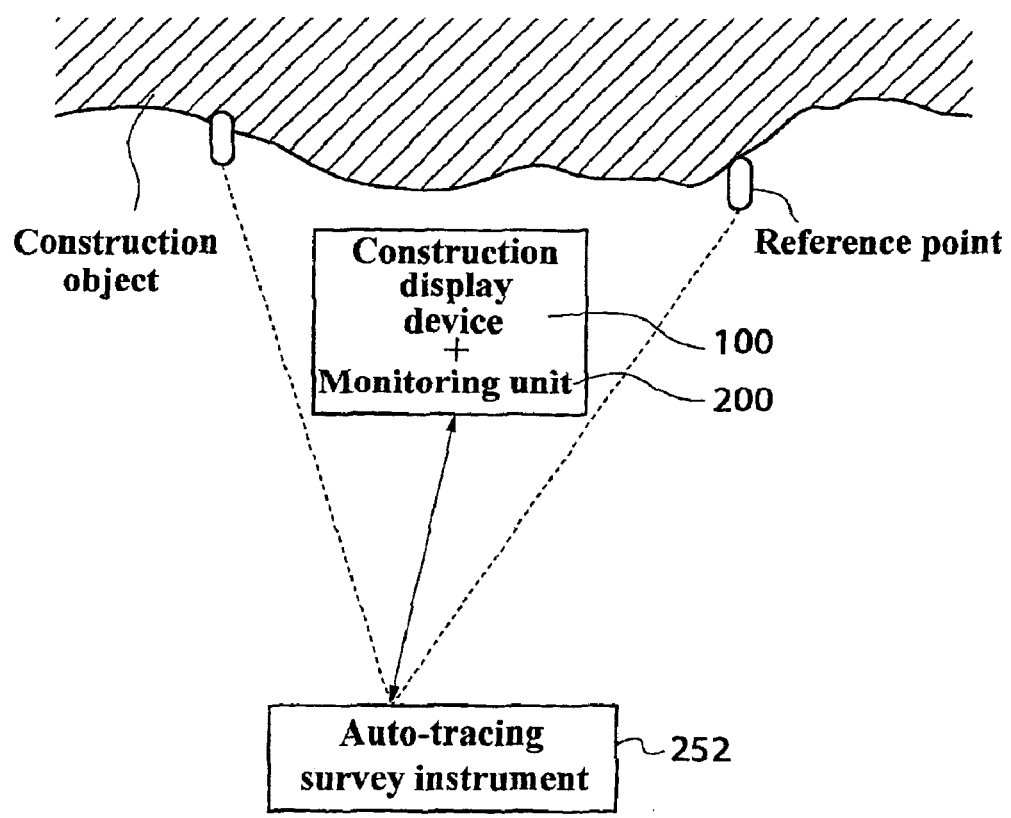
FIG. 18 is a block diagram, showing the second embodiment of use of the construction display device on a construction site.

FIG. 18 is a block diagram, showing the second embodiment of use of the construction display device on a construction site. The drawing shows an arrangement in which the construction display device 100 and the monitoring unit 200 are combined into a single unit to measure positions with an automatic tracing type of surveying instrument. With the above arrangement, since the construction stereo camera 210 is located in the construction executing position of the work machine, distance images from the actual visual point of construction are obtained. An example of such arrangement including the monitoring unit 200 and a work machine is shown in FIG. 19. The construction position taking section 150 and the monitoring unit 200 are provided on the ceiling portion of the operator's compartment of the work machine.

Figure 20:
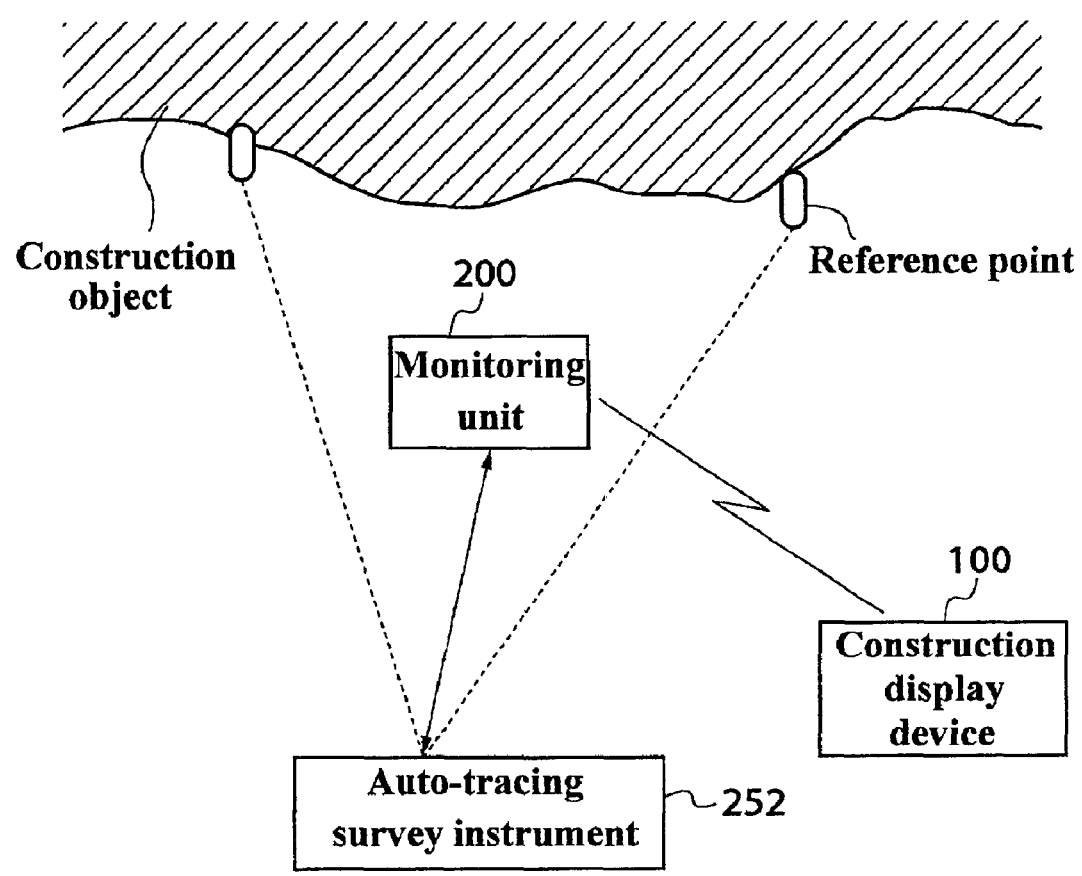
FIG. 20 is a block diagram, showing the third embodiment of use of the construction display device on a construction site.

FIG. 20 is a block diagram, showing the third embodiment of use of the construction display device on a construction site. In this state of use, the monitoring unit 200 is placed on the construction site and the construction display device 100 is placed in a distant place to measure positions with the automatic tracing type of surveying machine. That is, the construction display device 100 may be placed in a construction management office. Such an arrangement is suitable for situations in which unmanned operation of the work machine is required because of dangerous or severe labor conditions as in a desert or mine. In the case of such unmanned operation of the work machine, a virtual, computer-formed CG image is, as shown in FIG. 17, superposed on the real image as seen by the observer, and displayed before the operator of the work machine.

In the first embodiment of use of the construction display device on the construction site, as shown in FIG. 2 the construction display device 100 and the monitoring unit 200 are fixed in position to obtain stabilized vision of the construction site motion image. However, the construction display device 100 and the monitoring unit 200 may be arranged to be movable. In the first embodiment of use, the construction stereo camera 210 and the measurement-purpose stereo cameras 220 are placed as a whole in the monitoring unit 200. However, they can be placed in separate positions, with the construction stereo camera 210 placed in the construction display device 100 and with the measurement-purpose stereo cameras 220 placed in the monitoring unit 200. Placing the construction stereo camera 210 in the construction display device 100 is helpful as for unmanned operation of the work machine and for training operators.

Figure 21:
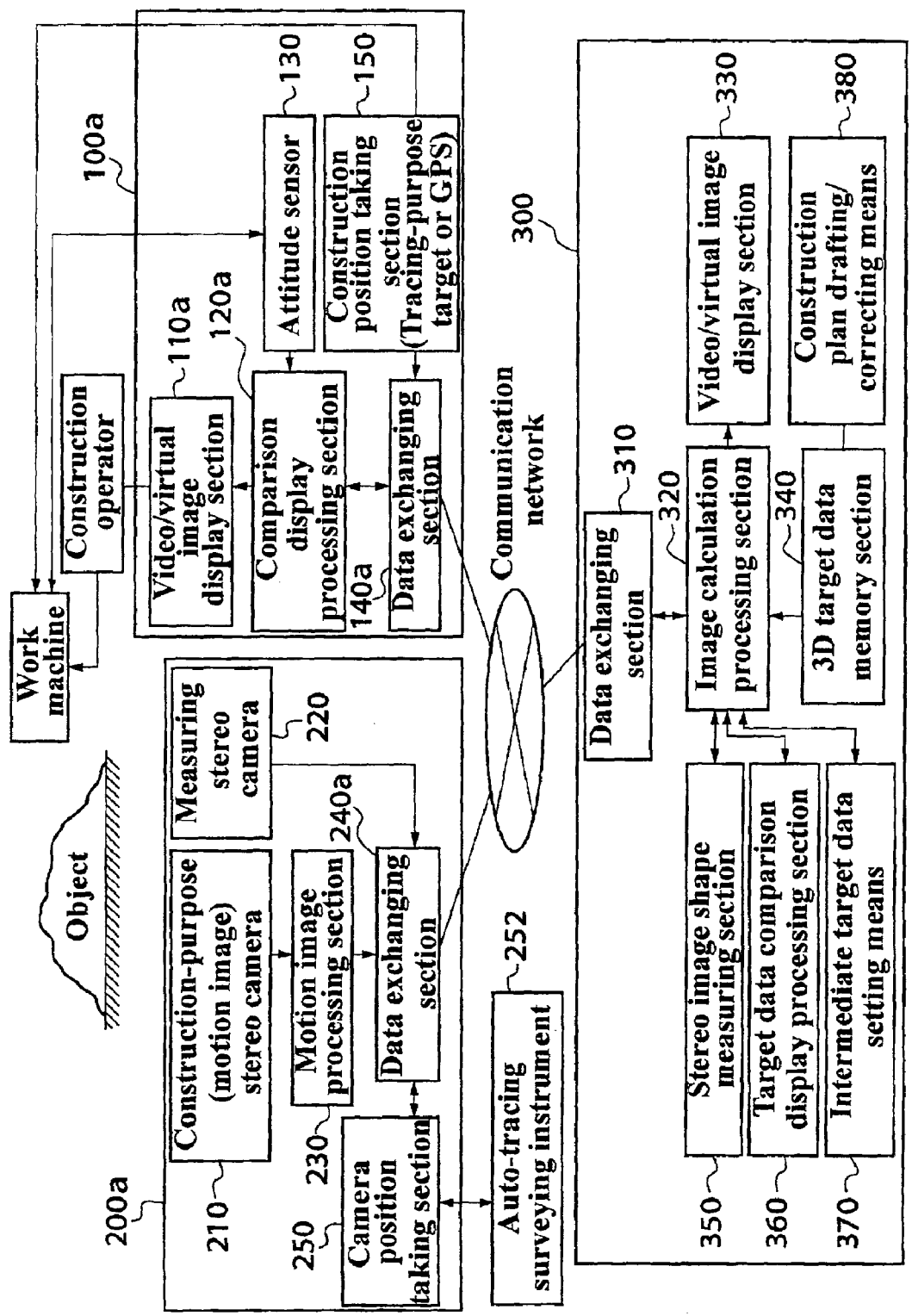
FIG. 21 is a block diagram of a modified embodiment of the construction monitoring system having the construction display device and the construction status measurement device shown in FIG. 1, showing the fourth embodiment of use of the construction display device on the construction site.

FIG. 21 is a block diagram of a modified embodiment of the construction monitoring system comprising the construction display device and the construction status measurement device shown in FIG. 1, and shows the fourth embodiment of use of the construction display device on the construction site. While the construction display device 100 shown in FIG. 1 is arranged to display the real image and the virtual image in superposition, the construction display device 100a for use in the fourth embodiment is arranged to show the object image and the virtual image in superposition. In FIG. 21, the same components as those in FIG. 1 are provided with the same reference numerals without explanation, and explanation is made only for different points.

In reference to FIG. 21, stereovision images of an object are sent from either the construction stereo camera 210 or the measurement-purpose stereo camera 220 in a monitoring unit 200a, through a data exchanging section 240a to a data exchanging section 140a of the construction display device 100a.

The comparison display processing section 120a of the construction display device 100a, using the attitude data of the construction display device 100a measured with the attitude sensor 130 and the three-dimensional position of the construction display device 100a obtained with the construction position taking section 150, converts the target data images sent from the construction status measuring device 300 and the stereovision images of the object sent from the monitoring unit 200a to the construction display device 100a to those as seen from the visual point of the construction operator. Then the comparison display processing section 120a matches the positions of the target data images and the stereovision images of the object, and sends them to the real video/virtual image observing section 110a. Thus, the construction operator can observe the construction status at the real video/virtual image observing section 110a on which the target data images and the stereovision images of the object are combined into a CG image.

In this case, it may be constituted to choose one of two functions, the function of displaying in superposition the real image and the virtual image of the construction display device 100 shown in FIG. 1, and the function of displaying the CG images by combining together the stereovision images of the object and the target data images of the construction display device 100a shown in FIG. 21, so that the construction operator can switch the function at the operator's convenience.

INDUSTRIAL APPLICABILITY

As described above, the image measurement and display device of the invention comprises: a shape measuring section for measuring shape data from a pair of stereovision images of an object taken with an image taking section, a memory section for storing target data related to the images of the object, an image display section for displaying in superposition the paired stereovision images of the object and the stereovision target data image based on the target data, and a comparison display processing section for comparing the shape data of the object with the target data and reflecting the results of the comparison on the superposed display on the image display section. Therefore, the object of processing or construction can be measured and compared with design drawings accurately.

The image measurement and display device of the invention comprises: a shape measuring section for measuring shape data from a pair of stereovision images of an object taken with an image taking section, a memory section for storing target data related to the image of the object, an image observing section for displaying in superposition, in the state of the object related to the target data being visible, the stereovision target data images of the object based on the target data, and a comparative observation display processing section for comparing the object shape measured by the shape measuring section with the shape corresponding to the target data and for reflecting the comparison results on the stereovision target data image display on the image observing section. Therefore, it is easy for the person in charge of processing or construction to find out whether the processing or construction is carried out exactly as described on design drawings, and to carry out it as designed.

The construction status monitoring system according to the invention comprises: an image measurement and display device, and a construction plan drafting and correcting means for calculating work-related data up to the time of processing the object to meet the target data. Therefore, it is useful for finding out accurately the daily status of progress in the work of construction or the like and organizing the work flexibly to meet construction plans.

What is claimed is:

1. An image measurement and display device comprising:
   a shape measuring section for measuring shape data of an object under construction from a pair of stereovision images of the object taken with an image taking section;
   a memory section for storing target data related to the images of the object;
   an image display section for displaying in superposition the paired stereovision images of the object and stereovision target data images of the object based on the target data; and
   a comparison display processing section for comparing the shape data of the object with the target data and for reflecting the comparison results on the superposed display on the image display section; and
   an intermediate target data setting means for setting intermediate target data as the target data for the comparison display processing section and the image display section, in every stage of the construction on the object, the comparison display processing section comparing the shape of the object with the shape corresponding to the intermediate target data.

2. An image measurement and display device according to claim 1, wherein, the comparison results obtained with the comparison display processing section are reflected so that the part where the shape of the object approximately agrees with the shape corresponding to the target data is displayed distinguishably on the image display section.

3. An image measurement and display device according to claim 2, wherein, as the results of the comparison with the comparison display processing section, the distance or interval to the object is associated with that to the target data and then the comparative sizes of the object and the target data are displayed distinguishably on the image display section.

4. An image measurement and display device according to claim 1, wherein, as the results of the comparison with the comparison display processing section, the distance or interval to the object is associated with that to the target data and then the comparative sizes of the object and the target data are displayed distinguishably on the image display section.

5. An image measurement and display device comprising:
   a shape measuring section for measuring shape data of an object under construction from a pair of stereovision images of an object taken with an image taking section;
   an imaging position measuring section for measuring the position where the image taking section takes images of the object;
   a memory section for storing target data related to the images of the object;
   an image display section for displaying in superposition the image of the object and the target data image based on the target data, on the basis of the imaging position measured with the imaging position measuring section; and
   a comparison display processing section for comparing, on the basis of the imaging position measured with the imaging position measuring section, the shape of the object with the shape corresponding to the target data, and for reflecting the comparison results on the superposed display on the image display section; and
   an intermediate target data setting means for setting intermediate target data as the target data for the comparison display processing section and the image display section, in every stage of the construction on the object, the comparison processing section comparing the shape of the object with the shape corresponding to the intermediate target data.

6. An image measurement and display device comprising:
   a shape measuring section for measuring the shape data of an object from a pair of stereovision images of the object taken with an image taking section;
   a memory section for storing target data related to the images of the object;
   an image observing section for superposing the object related to the target data and the stereovision target data image of the object based on the target data and for displaying with the object remaining to be visible with at least one of a head-up display and a head-mount display; and
   a comparative observation display processing section for comparing the shape of the object measured by the shape measuring section, with the shape corresponding to the target data and for reflecting the result of the comparison on the stereovision target data image display of the image observing section.

7. An image measurement and display device according to claim 6, wherein the comparison results obtained with the comparative observation display processing section are reflected so that the part where the shape of the object approximately agrees with the shape corresponding to the target data is displayed distinguishably on the image observation section.

8. An image measurement and display device according to claim 7, wherein, as the results of the comparison with the comparative display processing section, the distance or interval to the object is associated with that to the target data and the comparative sizes of the object and the target data are then displayed distinguishably on the image observation section.

9. An image measurement and display device according to claim 6, wherein the comparison results obtained with the comparative observation display processing section are reflected so that the part where the shape of the object approximately agrees with the shape corresponding to the target data is displayed distinguishably on the image observation section.

10. An image measurement and display device according to claim 9, wherein, as the results of the comparison with the comparative display processing section, the distance or interval to the object is associated with that to the target data and the comparative sizes of the object and the target data are then displayed distinguishably on the image observation section.

11. An image measurement and display device according to claim 6, wherein; as the results of the comparison with the comparative display processing section, the distance or interval to the object is associated with that to the target data and the comparative sizes of the object and the target data are then displayed distinguishably on the image observation section.

12. An image measurement and display device comprising:
    a shape measuring section for measuring the shape data of an object from a pair of stereovision images of the object taken with an image taking section;
    an imaging position measuring section for measuring the imaging position of the image taking section;
    a memory section for storing target data related to the images of the object;
    an image observing section for superposing the object related to the target data, on the basis of the imaging position measured with the imaging position measuring section the stereovision target data image of the object based on the target data, and for displaying with the object remaining to be visible with at least one of a head-up display and a head-mount display; and
    a comparative observation display processing section for comparing, on the basis of the imaging position measured with the imaging position measuring section, the shape of the object measured by the shape measuring section, with the shape corresponding to the target data and for reflecting the result of the comparison on the stereovision target data image display of the image observing section.

13. An image measurement and display system comprising:
    an image taking section for taking a pair of stereovision images of an object;
    an image display section for displaying the images taken with the image taking section; and
    a construction status measuring device including a memory section for storing target data related to the images of the object and an image calculation processing section for processing the images of the object taken with the image taking section;
    wherein the image measurement and display system is allowed to exchange data among the image taking section, the image display section, and the construction status measuring device;
    the construction status measuring device further comprises a shape measuring section for measuring the shape of the object from the paired stereovision images taken with the image taking section and a comparison display processing section for comparing the shape of the object measured by the shape measuring section, with the shape corresponding to the target data; and
    the image display section displays in superposition the image of the object taken with the image taking section and the target data image based on the target data sent from the construction status measuring device.

14. An image measurement and display system according to claim 13, wherein the data exchange among the image taking section, the image display section, and the construction status measuring device is performed by one of wireless, optical, Internet, and cable communications.

15. A method of managing construction, comprising the steps of:
    determining the three-dimensional position of a construction display device with an image taking position measuring section;
    acquiring distance images from multiple stereovision images in real time in two dimensions;
    superposing, on the basis of the three-dimensional positions, the target data and the stereovision images of an object being processed and displaying the superposed image on the construction display device; and
    causing a work machine to execute work according to the information on deviation of the stereovision images, related to the object being processed, from the target data.

16. A method of managing construction, comprising the steps of:
    determining the three-dimensional position of a construction display device with a imaging position measuring section;
    acquiring distance images from multiple stereovision images in real time in two dimensions;
    measuring the multiple stereovision images;
    analyzing construction progress status from the current status of an object being processed and target data; and
    updating from time to time construction plan for realizing the target data according to the results of analyzing the construction progress status.

17. A system for monitoring the status of construction, comprising:
    a shape measuring section for measuring shape data of an object under construction from a pair of stereovision images of the object taken with an image taking section;
    a memory section for storing target data related to the images of the object;
    an image display section for displaying in superposition the paired stereovision images of the object and stereovision target data images of the object based on the target data; and
    a comparison display processing section for comparing the shape data of the object with the target data and for reflecting the comparison results on the superposed display on the image display section; and
    a construction plan drafting and correcting means for calculating from the comparison results obtained with the comparison display processing section, the work related data for processing or treating an object to meet the target data.

* * * * *